(12) United States Patent
Chiang

(10) Patent No.: US 7,277,832 B2
(45) Date of Patent: Oct. 2, 2007

(54) DYNAMICAL METHOD FOR OBTAINING GLOBAL OPTIMAL SOLUTION OF GENERAL NONLINEAR PROGRAMMING PROBLEMS

(75) Inventor: Hsiao-Dong Chiang, Ithaca, NY (US)

(73) Assignee: Bigwood Technology, Inc., Ithaca, NY (US)

( * ) Notice: Subject to any disclaimer, the term of this patent is extended or adjusted under 35 U.S.C. 154(b) by 1034 days.

(21) Appl. No.: 09/849,213

(22) Filed: May 4, 2001

(65) Prior Publication Data

US 2002/0183987 A1    Dec. 5, 2002

(51) Int. Cl.
*G06F 17/50*    (2006.01)
*G06F 3/00*    (2006.01)
(52) U.S. Cl. .................... 703/2; 703/6; 700/49; 706/10
(58) Field of Classification Search .................... 703/2, 703/6–22; 705/8; 700/28–55, 19; 706/13, 706/19, 46, 10; 717/104
See application file for complete search history.

(56) References Cited

U.S. PATENT DOCUMENTS

| | | | | |
|---|---|---|---|---|
| 5,343,554 | A | * | 8/1994 | Koza et al. .................... 706/13 |
| 5,483,462 | A | | 1/1996 | Chiang ........................ 364/492 |
| 5,784,596 | A | * | 7/1998 | Melamed et al. .............. 703/2 |
| 5,870,564 | A | * | 2/1999 | Jensen et al. ................ 709/241 |
| 5,963,447 | A | * | 10/1999 | Kohn et al. .................... 700/49 |
| 6,088,689 | A | * | 7/2000 | Kohn et al. .................... 706/10 |
| 6,477,515 | B1 | * | 11/2002 | Boroujerdi et al. ............ 706/14 |
| 6,694,196 | B2 | * | 2/2004 | Tuttle et al. ................... 700/28 |
| 6,934,931 | B2 | * | 8/2005 | Plumer et al. ............... 717/104 |
| 7,043,309 | B2 | * | 5/2006 | Jackson et al. ................ 700/19 |
| 7,050,953 | B2 | * | 5/2006 | Chiang et al. ................. 703/2 |
| 2001/0051936 | A1 | * | 12/2001 | Michalewicz ................. 706/46 |
| 2004/0205036 | A1 | * | 10/2004 | Prabhu et al. ................. 706/19 |

OTHER PUBLICATIONS

Lee et al, "Quotient Gradient Methods for Solving Constraint Satisfaction Problems," 2001 IEEE International Symposium on Circuits and Systems, vol. 2, pp. 365-368 (May 2001).*
Rantzer et al, "On Convexity in Stabilization of Nonlinear Systems," Proceedings of the 39 IEEE Conference on Decision and Control, vol. 3, pp. 2942-2945 (Dec. 2000).*

(Continued)

*Primary Examiner*—Thai Phan
(74) *Attorney, Agent, or Firm*—Brown & Michaels, PC

(57) ABSTRACT

A method for obtaining a global optimal solution of general nonlinear programming problems includes the steps of first finding, in a deterministic manner, all stable equilibrium points of a nonlinear dynamical system that satisfies conditions (C1) and (C2), and then finding from said points a global optimal solution. A practical numerical method for reliably computing a dynamical decomposition point for large-scale systems comprises the steps of moving along a search path $\phi_t(x_s) = \{x_s + t \times \hat{s}, t \in \Re^+\}$ starting from $x_s$ and detecting an exit point, $x_{ex}$, at which the search path $\phi_t(x_s)$ exits a stability boundary of a stable equilibrium point $x_s$ using the exit point $x_{ex}$ as an initial condition and integrating a nonlinear system to an equilibrium point $x_d$, and computing said dynamical decomposition point with respect to a local optimal solution $x_s$ wherein the search path is $x_d$.

20 Claims, 10 Drawing Sheets

OTHER PUBLICATIONS

Champsaur et al, "Stability Theorems With Economic Applications," Econometrica, vol. 45 No. 2, pp. 273-294 (Mar. 1977).*

Chiang, Hsiao-Dung and Fekih-Ahmed, Lazhar. "Quasi-Stability Regions of Nonlinear Dynamical Systems: Theory. Ieee Transactions On Circuits and systems -I: Fundamental Theory and Applications." vol. 43, No. 8, Aug. 1996.

Chiang, Hsiao-Dung and Fekih-Ahmed, Lazhar. "Quasi-Stability Regions of Nonlinear Dynamical Systems: Optimal Estimations." Ieee Transactions On Circuits and systems-I: Fundamental Theory and Applications. vol. 43, No. 8, Aug. 1996.

Chiang, Hsiao-Dong and Chu Chia-Chi. "A Systematic Search Method for Obtaining Multiple Local Optimal Solutions of Nonlinear Programming Problems." Ieee Transactions On Circuits and systems -I: Fundamental Theory and Applications, vol. 43, No. 2, Feb. 1996.

Chiang, Hsiao-Dong and lee, Jaewook. "Constructive Homotopy Methods for Finding All or Multiple DC Operating Points of Nonlinear Circuits and Systems." Ieee Transactions On Circuits and systems -I: Fundamental Theory and Applications, vol. 48, No. 1, Jan. 2001.

* cited by examiner

DYNAMICAL METHOD FOR OBTAINING GLOBAL OPTIMAL SOLUTION OF GENERAL NONLINEAR PROGRAMMING PROBLEMS

BACKGROUND OF THE INVENTION

1. Field of the Invention

The invention pertains to the field of mathematical analysis and modeling. More particularly, the invention pertains to a dynamical method for obtaining a global optimal solution of general nonlinear programming problems.

2. Description of Related Art

A large variety of the quantitative decision issues arising in the sciences, engineering, and economics can be perceived and modeled as constrained nonlinear optimization problems. According to this generic description, the best decision, often expressed by a real vector, is sought in the search space which satisfies all stated feasibility constraints and minimizes (or maximizes) the value of an objective function. The vector, if it exists, is termed the "global optimal solution." In general, there are solutions that are locally optimal (a local optimal solution is optimal in a local region of the search space) but not globally optimal.

In general, the search space of a constrained nonlinear optimization problem contains a number of local optimal solutions. Typically, the number of local optimal solutions is unknown and it can be quite large. Furthermore, the values of an objective function at local optimal solutions and at the global optimal solution may differ significantly. The great majority of existing nonlinear optimization techniques usually come up with local optimal solutions but not the global optimal one.

The task of finding the global optimal solution of constrained nonlinear optimization problems is important for a very broad range of applications in the design, operation, and planning problems arising in various engineering disciplines and the sciences. Engineering application areas include, for example, structural optimization, engineering design, VLSI chip design and database problems, image processing, computational chemistry, molecular biology, nuclear and mechanical design, chemical engineering design and control, optimal power flow in electric networks, economies of scale, fixed charges, allocation and location problems, and quadratic assignment, as well as numerous other applications.

The problem of finding the global optimal solution, termed the Global Optimization (GO) problem is very difficult and challenging. From the computational complexity point of view, the task of finding the global optimal solution of constrained nonlinear optimization problems belongs to the class of NP-hard problems. This implies that the computational time required to solve the problem is expected to grow exponentially as the input size of the problem increases.

Existing methods proposed for solving the GO problem can be categorized into three classes: deterministic methods, stochastic methods, and hybrid methods. Deterministic methods typically provide mathematical guarantees for convergence to an approximate global minimum in finite steps for optimization problems involving certain mathematical structures. This class of methods includes the branch and bound methods, cutting planes, decomposition-based approaches, covering methods, interval methods, homotopy methods, and generalized gradient methods. On the other hand, stochastic methods require sampling the objective functions and perhaps computing their derivatives to find the global optimal solution. They are applicable to a wide range of GO problems; however, the required number of samples necessary to arrive at the global optimal solution is often prohibitive for high-dimension problems. The class of stochastic methods is characterized by a slow convergence and a lack of accuracy when an exact global optimal solution is required. Random search methods, genetic algorithms, simulated annealing, clustering methods, and Bayesian methods all belong to the class of stochastic methods. Hybrid methods for GO problems is a recently proposed class; this class of methods usually, if not always, combines one stochastic method, for example, the genetic algorithms, with one classical 'hill-climbing' method, such as the Quasi-Newton method. The idea of combining two different methods into one in order to attempt to merge their advantages and to reduce their disadvantages is well known. The question associated with this combination is what methods to merge and how to merge them. This class of hybrid methods suffers from a slow convergence, inherited from the stochastic method, but it improves the problem of accuracy with the help of a 'hill-climbing' method.

The only reliable way to find the global optimal solution of a nonlinear optimization problem is to first find all the local optimal solutions and then find, from them, the global optimal solution. In the present invention, we develop a new systematic methodology, which is deterministic in nature, to find all the local optimal solutions of both unconstrained and constrained nonlinear optimization problems. Two classes of global optimization methodology are developed in this invention:

- a dynamical trajectory-based methodology for unconstrained nonlinear programming problems; and
- a dynamical trajectory-based methodology for constrained nonlinear programming problems.

For unconstrained nonlinear optimization problems, one distinguishing feature of the new methodology is that it systematically finds all the local optimal solutions. For constrained nonlinear optimization problems, one distinguishing feature of the new methodology of the present invention is that it systematically finds all the local optimal solutions of constrained nonlinear optimization problems whose feasible regions can be disconnected. Our developed methodology consists of two distinct phases: Phase I systematically locates each connected feasible region of the entire feasible region. Phase II then finds all the local optimal solutions lying in each feasible region obtained in Phase I.

In the present invention, methods are developed for the following two important issues in the search for the global optimal solution:

(i) how to effectively move (escape) from a local optimal solution and move on toward another local optimal solution; and (ii) how to avoid revisiting local optimal solutions which are already known.

In the past, significant efforts have been directed towards attempting to address this issue, but without much success. Issue (i) is difficult to solve and both the class of deterministic methods and the class of stochastic methods all encounter this difficulty. Issue (ii), related to computational efficiency during search, is also difficult to solve and, again, both the class of deterministic methods and the class of stochastic methods encounter this difficulty. In the present invention, effective methods to overcome these issues are developed and incorporated into the dynamical trajectory-based methodology.

Our previous work related to unconstrained global optimization problems is described in H. D. Chiang, Chia-Chi Chu, A Systematic Search Method for Obtaining Multiple Local Optimal Solutions of Nonlinear Programming Problems, *IEEE Trans. Circuits and Systems*, vol. 43, pp. 99-109, 1996, the complete disclosure of which is hereby incorporated herein by reference. This work focused on the idea of constructing a particular nonlinear dynamical system and on the development of conceptual methods that are rich in theory, but are difficult, if not impossible, to implement numerically for practical applications. This work was extended to constrained global optimization problems in Jaewook Lee, Path-following methods for global optimization, Ph.D. dissertation, Cornell Univ., NY, 1999, the complete disclosure of which is hereby incorporated herein by reference. Among other things, this publication presents construction of two particular nonlinear dynamical systems for performing a two-phase optimization procedure, which is again rich in theory but difficult, if not impossible, to implement numerically for practical applications. The idea of computing exit points of a class of non-linear systems in U.S. Pat. No. 5,483,462, On-line Method for Determining Power System Transient Stability, issued to Hsiao-Dong Chiang on Jan. 9, 1996, the complete disclosure of which is hereby incorporated herein by reference.

This invention differs from the prior art in the following aspects (as well as others):

(1) this invention develops a class of nonlinear dynamical systems (see conditions (C1) and (C2) for unconstrained optimization problems and conditions (C1-1), (C1-2), (C2-1) and (C2-2) for constrained optimization problems) and shows that their system trajectories can be exploited to develop numerical methods for finding a complete set of local optimal solutions and the global optimal solution (2) the particular nonlinear dynamical systems in the aforementioned publications all belong to the class of nonlinear dynamical systems developed in this invention (3) this invention develops a dynamical trajectory-based method which can incorporate any existing local optimizer (i.e., a method for finding a local optimal solution) into it, hence, this invention can be applied to guide any existing computer package to find a complete set of local optimal solutions and the global optimal solution (4) this invention can be programmed to interface with any existing computer package without the need to modify the 'environment' of the existing computer package (which include the graphical user interface data base) to find a complete set of local optimal solutions and the global optimal solution, and, in particular, this invention imposes no new learning curve for the user in the combined computer package 5) this invention develops a numerical method, termed dynamical decomposition point search method, for guiding the search process to escape from trapping at a local optimal solution in a deterministic manner 6) this invention extends a previous patented method to develop a numerical method, termed a numerical method for computing the exit point, which is incorporated into the dynamical decomposition point search method 7) this invention develops a numerical method, termed an improved method for computing the exit point, which is incorporated into the dynamical decomposition point search method 8) this invention develops a numerical method, termed a numerical method for computing the minimum distance point (MDP), which is incorporated into the dynamical decomposition point search method 9) this invention develops a numerical method, termed an improved method for computing the minimum distance point (MDP), which is incorporated into the dynamical decomposition point search method 10) this invention develops a hybrid search method, which is composed of a trajectory-based method and an effective local optimization method for finding local optimal solutions. The hybrid method shares the reliability and accuracy of the former method and the accuracy and computational speed of the latter 11) this invention develops a method for anti-revisit of local optimal solutions to avoid searching regions which contain previously found local optimal solutions. The invention also develops a DDP-based numerical method, which, in combination with the DDP search method, performs a procedure that searches from a local optimal solution to find another local optimal solution in a deterministic manner 12) this invention develops a dynamical trajectory-based method, which can incorporate any existing local optimizer (i.e., a method for finding a local optimal solution). Hence, this invention can be applied to guide any existing computer package to find a complete set of local optimal solutions and the global optimal solution. The invention can be programmed to interface with any existing computer package without the need to modify the 'environment' of the existing computer package (which includes the graphical user interface data base) to find a complete set of local optimal solutions and the global optimal solution. In particular, this invention imposes no new learning curve for the user in the combined computer package The theoretical basis of these methods is described as follows.

We treat the problem of how to escape from a local optimal solution and to move on toward another local optimal solution as the problem of how to escape from the stability region of the corresponding (asymptotically) stable equilibrium point (s.e.p.) of a nonlinear dynamical system satisfying certain conditions and enter into the stability region of another corresponding s.e.p. of the nonlinear dynamical system. There are several ways to construct nonlinear dynamical system satisfying the required conditions. The present invention presents guidelines for constructing such nonlinear dynamical systems.

One common problem which degrades the performance of many existing methods searching for the global optimal solution is the re-visitation of the same local optimal solutions several times; this wastes computing resources without gaining new information regarding the location of the global optimal solution. From the computational viewpoint, it is important to avoid revisiting the same local optimal solution in order to maintain a level of efficiency. To address issue (ii), we develop in this invention an anti-revisiting search method for both unconstrained and constrained optimization problems. The theoretical basis of the anti-revisiting search method rests on the dynamical decomposition points developed in this invention.

The present invention develops a method for anti-revisit of local optimal solutions to avoid searching regions which contain previously found local optimal solutions. The invention also develops a DDP-based numerical method, which, in combination with the DDP search method, performs a procedure that searches from a local optimal solution to find another local optimal solution in a deterministic manner.

From a practical viewpoint, the dynamical trajectory-based methodology developed in this invention requires integrating a set of ordinary differential equations (ODE). It was thought by many that ODE solvers are too extensive to be of general use compared with, for example, a conventional Newton-type method. However, their performance is significantly affected by the choice of integration method and the way in which the step size is controlled. When suitably implemented, these methods deserve a place in the mainstream of optimization algorithm development. See, for example, A. A. Brown and M. C. Bartholomew-Biggs, Some effective methods for unconstrained optimization based on the solution of systems of ordinary differential equations, *Journal of Optimization Theory and Applications*, vol. 62, pp. 211-224, 1989, the complete disclosure of which is hereby incorporated herein by reference.

The present invention develops a dynamical trajectory-based method, which can incorporate any existing local optimizer (i.e., a method for finding a local optimal solution). Hence, this invention can be applied to guide any existing computer package to find a complete set of local optimal solutions and the global optimal solution. The invention can be programmed to interface with any existing computer package without the need to modify the 'environment' of the existing computer package (which includes the graphical user interface data base) to find a complete set of local optimal solutions and the global optimal solution. In particular, this invention imposes no new learning curve for the user in the combined computer package.

SUMMARY OF THE INVENTION

Briefly stated, a method for obtaining a global optimal solution of general nonlinear programming problems includes the steps of first finding, in a deterministic manner, all stable equilibrium points of a nonlinear dynamical system that satisfies conditions (C1) and (C2), and then finding from said points a global optimal solution.

In an embodiment of the invention, a practical numerical method for reliably computing a dynamical decomposition point for large-scale systems comprises the steps of moving along a search path $\phi_t(x_s)=\{x_s+t\times\hat{s},\ t\in\mathfrak{R}^+\}$ starting from $x_s$ and detecting an exit point, $x_{ex}$, at which the search path $\phi_t(x_s)$ exits a stability boundary of a stable equilibrium point $x_s$ using the exit point $x_{ex}$ as an initial condition and integrating a nonlinear system to an equilibrium point $x_d$, and computing said dynamical decomposition point with respect to a local optimal solution $x_s$ wherein the search path is $x_d$.

DETAILED DESCRIPTION OF THE INVENTION

Example 1

Global Optimal Methodology for Unconstrained Nonlinear Programming Problems Consider a general unconstrained nonlinear optimization problem of the form:

$$\text{Minimize } C(x) \tag{4.1}$$

where $C:\mathfrak{R}^n\to\mathfrak{R}$ is a bounded below smooth function so that its global minimal solution exists and the number of local minimal solutions are finite.

Optimal solutions of an objective function $C(x)$ can be formally defined as follows: Let M be the set of feasible regions (i.e., all possible solutions which satisfy the constraints). We say $x^*$ is a local minimal solution if and only if $x^*\in M$ and there exists an $\epsilon>0$ such that the conditions $x\in M$ and $\|x-x^*\| < \epsilon$ imply $C(x) \geq C(x^*)$. We say $x^*$ is a global minimal solution if and only if $x^* \in M$ and $f(x) \geq f(x^*)$ for all $x \in M$.

Figure 1:
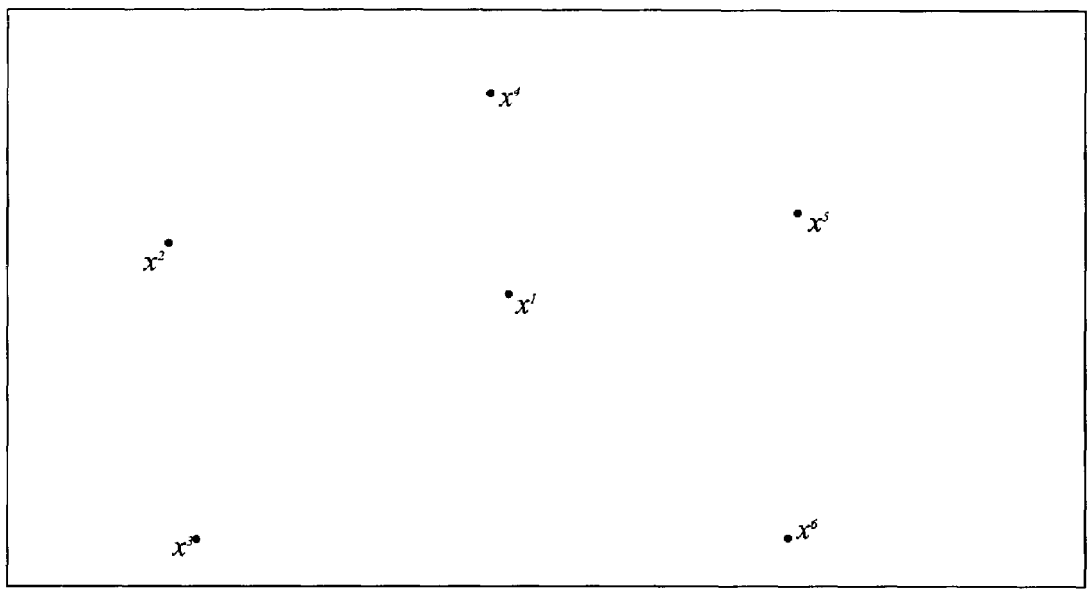
FIG. 1 shows a schematic wherein it is assumed that there are six local optimal solutions in an unconstrained optimization problem.

There are many (local) optimization methods available that can effectively find local optimal solutions, but not the global one. During their search process, these methods usually get trapped at a local optimal solution and cannot move to another local optimal solution. We maintain that the only reliable way to find the global optimal solution of the optimization problem (see FIG. 1) is to first find all of the local optimal solutions and then find, from them, the global optimal solution. We hence pose the following step:

Step 1: systematically find all the local optimal solutions of (4.1) in a deterministic manner.

Figure 2:
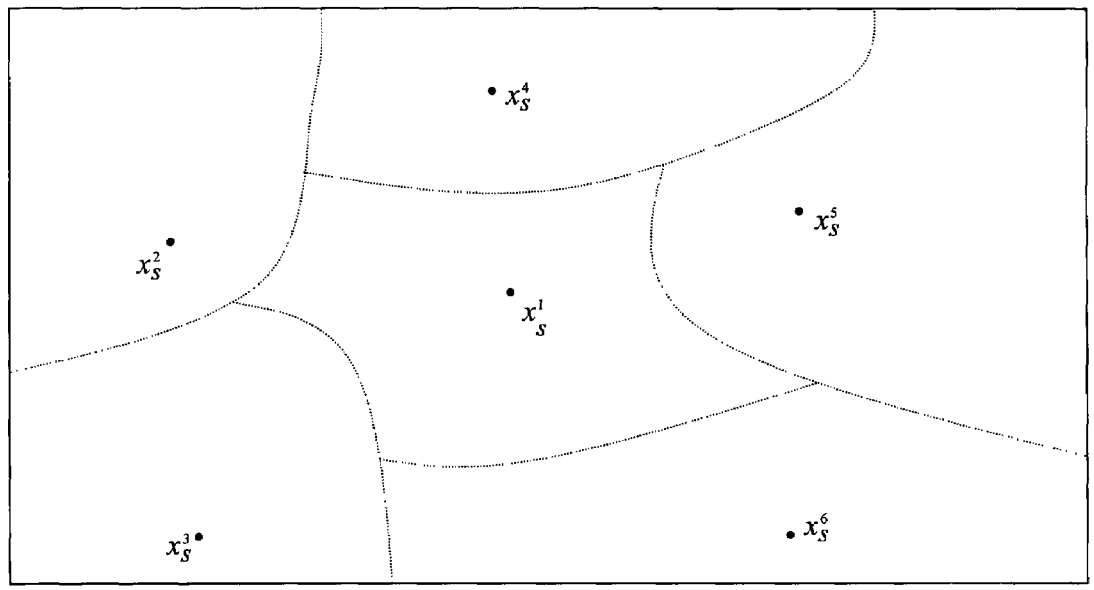
FIG. 2 shows a schematic wherein the six local optimal solutions of FIG. 1 become the stable equilibrium points of a nonlinear dynamical system and each stable equilibrium point has its own quasi-stability region.
Figure 3:
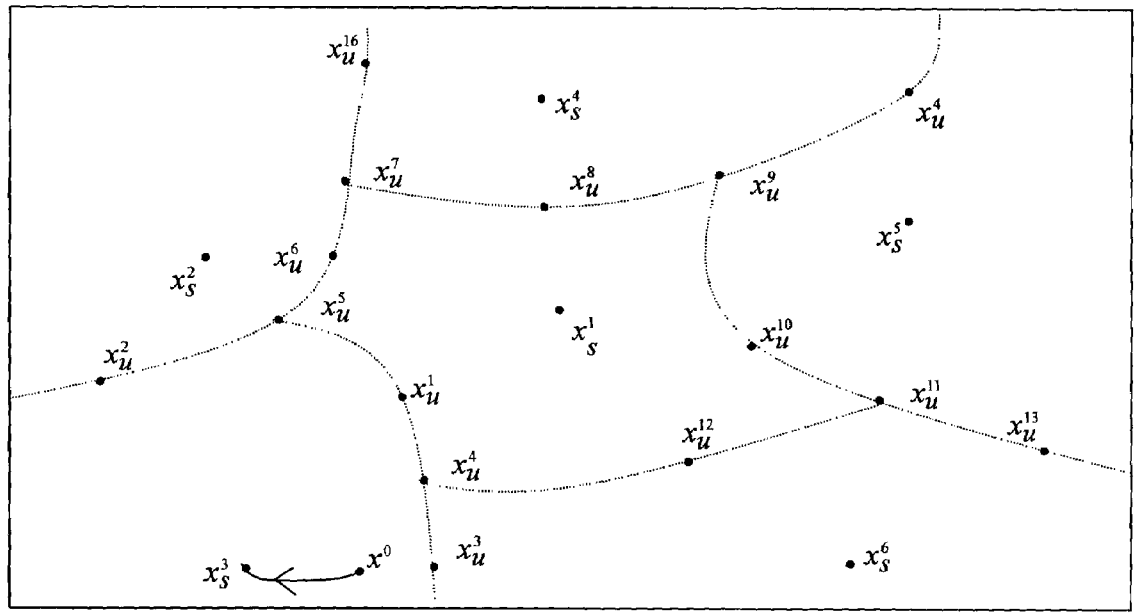
FIG. 3 shows a schematic wherein $x^0$ lies inside the quasi-stability region of $x_s^3$, and the hybrid method incorporated in the dynamical trajectory-based methodology finds the local optimal solution $x_s^3$.
Figure 4:
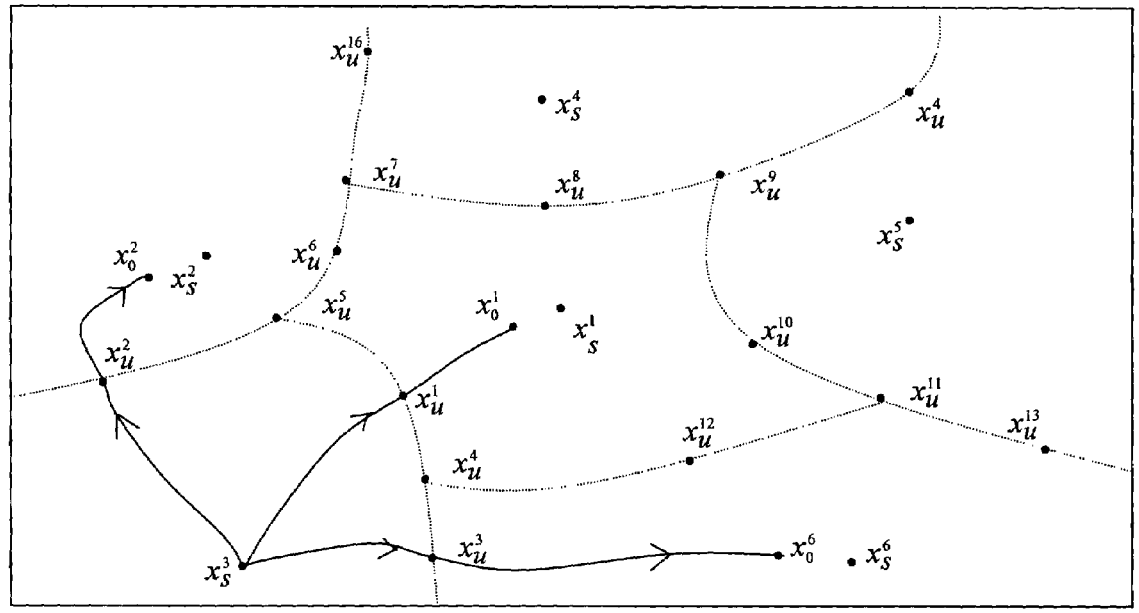
FIG. 4 shows a schematic wherein, starting at the local optimal solution $x_s^3$, the dynamical trajectory-based methodology effectively escapes from the local optimal solution and proceeds to find three points $x_0^1$, $x_0^2$, $x_0^6$ which lie inside the quasi-stability region of $x_s^1$, $x_s^2$, $x_s^6$ respectively.
Figure 5:
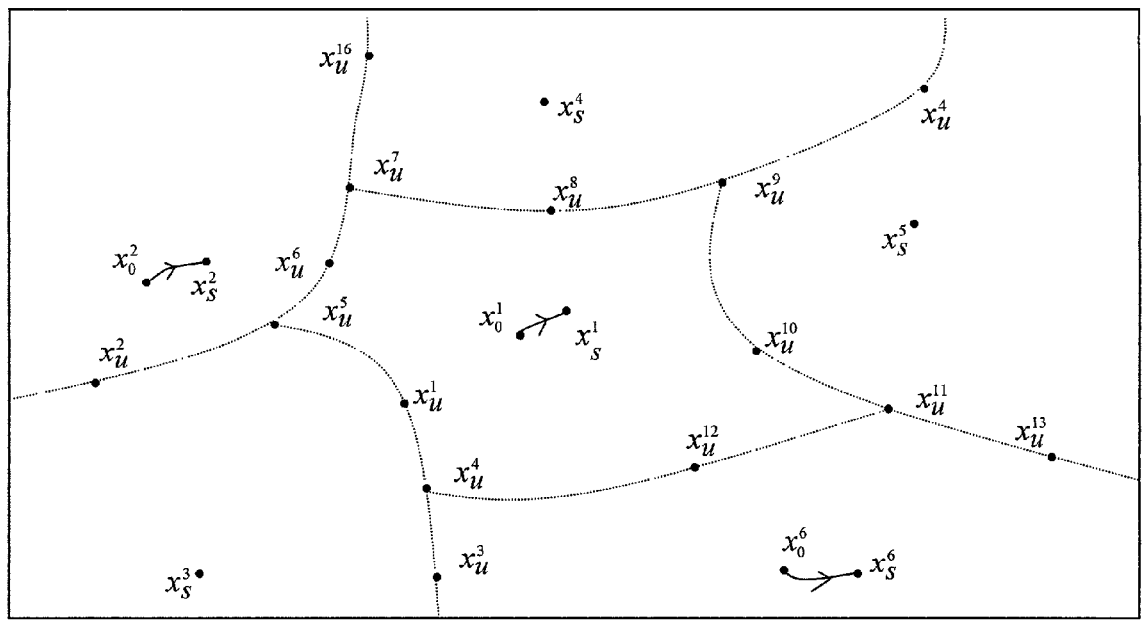
FIG. 5 shows a schematic wherein, starting from the three points $x_0^1$, $x_0^2$, $x_0^6$, the hybrid method incorporated in the dynamical trajectory-based methodology finds the local optimal solutions $x_s^1$, $x_s^2$, $x_s^6$ respectively.
Figure 6:
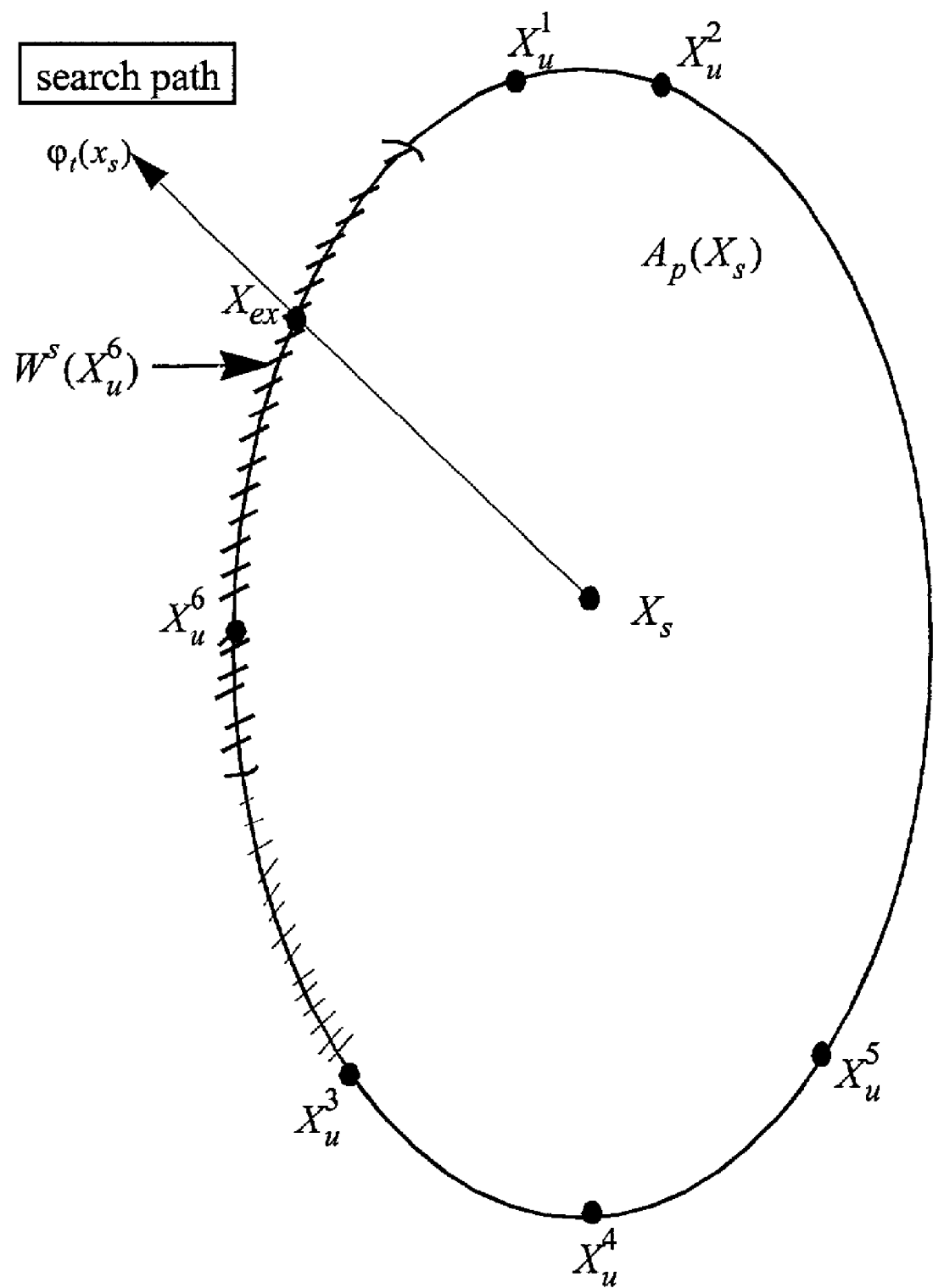
FIG. 6 shows a schematic wherein the search path $\phi_t(x_s)$, starting from $x_s$ intersects with the quasi-stability boundary of $x_s$ at the exit point $x_{ex}$.
Figure 7:
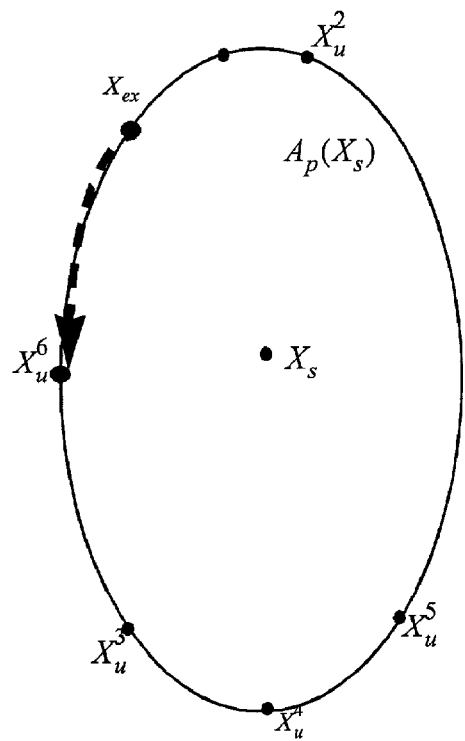
FIG. 7 shows a schematic wherein the exit point $x_{ex}$ is used as the initial condition and integration of the nonlinear system of FIG. 2 to the dynamical decomposition point $x_u^6$.
Figure 8:
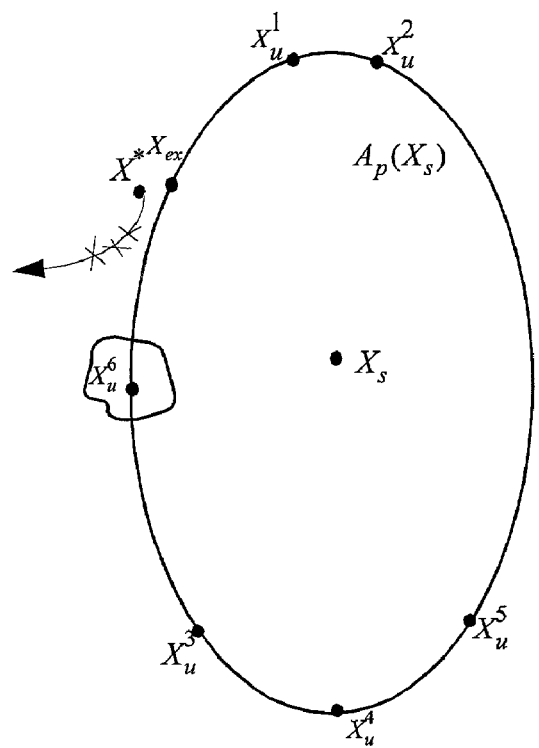
FIG. 8 shows a schematic wherein the simulated exit point $x^*$ is used as an initial condition and integration of the nonlinear system for a few time-steps, say 5.
Figure 9:
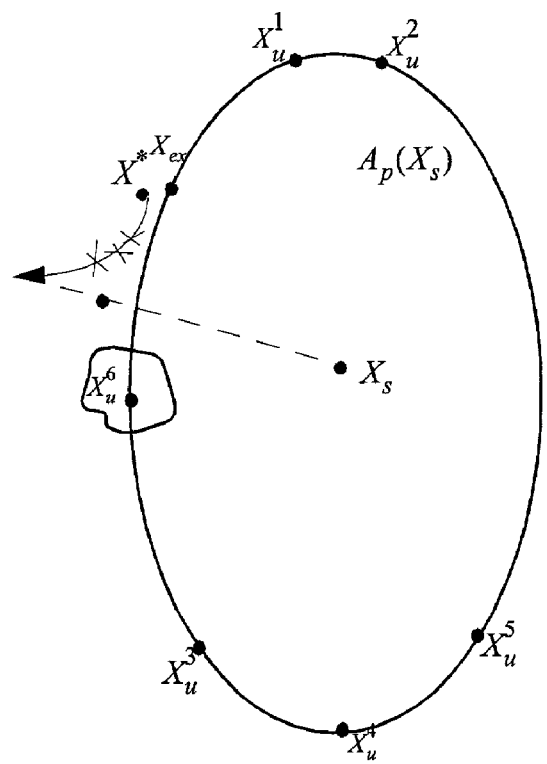
FIG. 9 shows a ray connecting the current point on the trajectory and the local optimal solution $x_s$. Replace the current point with the corrected exit point which is the (first) local maximal point of objective function along the ray starting from the stable equilibrium point. Assign this point to the exit point.
Figure 10:
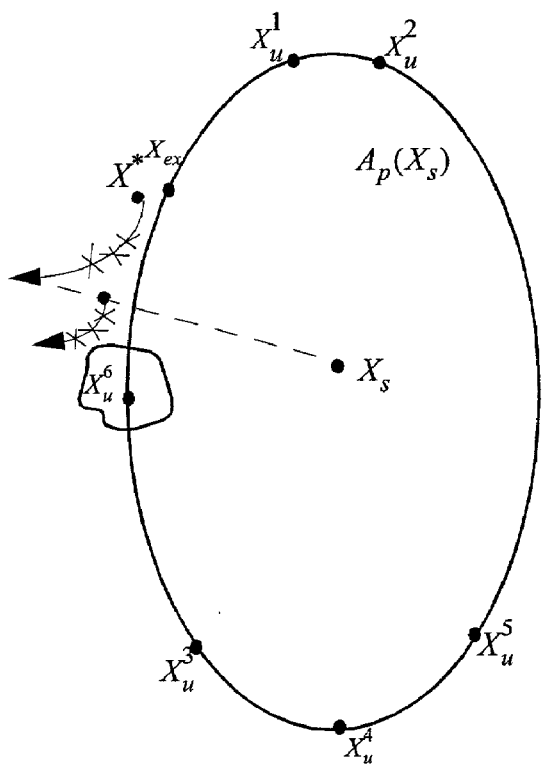
FIG. 10 shows a schematic wherein the corrected exit point is used as an initial condition and integration of the nonlinear system for a few time-steps, say 5.
Figure 11:
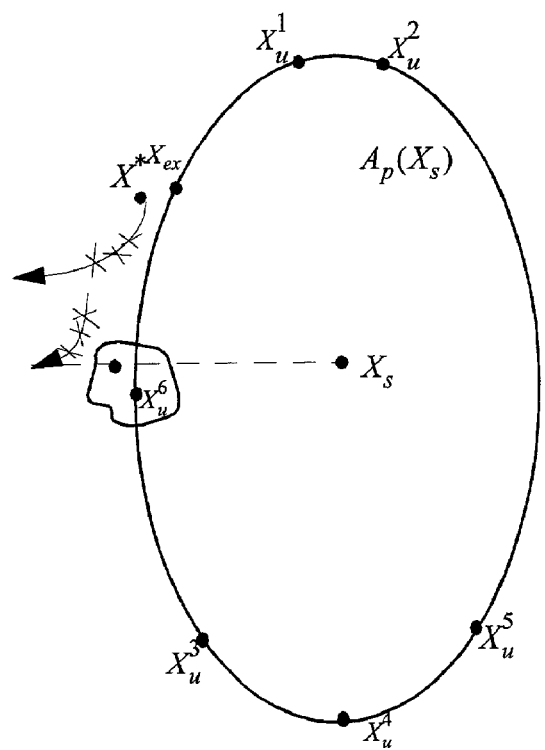
FIG. 11 shows a ray connecting the current point on the trajectory and the local optimal solution $x_s$. Replace the current point with the corrected exit point which is the (first) local maximal point of objective function along the ray starting from the stable equilibrium point. Since the corrected exit point is smaller than a threshold value, then the point is declared as the MDP.

To this end, we develop in this invention a dynamical trajectory-based methodology to systematically compute all the local optimal solutions of (4.1) via a nonlinear dynamical system that satisfies certain conditions to be discussed later. It thus transforms Step 1 into the following step:

Step 1: find all the stable equilibrium points of the nonlinear dynamical system that satisfies conditions (C1) and (C2) described below We use a simple example to illustrate the main functions of the dynamical trajectory-based methodology. Suppose there are six local optimal solutions in a unconstrained optimization problem (see FIG. 1). These six local optimal solutions become the stable equilibrium points of a nonlinear dynamical system that satisfies conditions (C1) and (C2) and each stable equilibrium point has its own quasi-stability region (see FIG. 2). Starting with an arbitrary initial condition (which in our transformation, it must lie inside the quasi-stability region of a stable equilibrium point), the hybrid method incorporated in the dynamical trajectory-based methodology finds the local optimal solution (i.e., the stable equilibrium point) (see FIG. 3). Given a local optimal solution, the dynamical trajectory-based methodology effectively escapes from the local optimal solution and proceeds to find all the adjacent local optimal solutions, whose corresponding quasi-stability boundary has a non-empty intersection with the quasi-stability boundary of the local optimal solution (see FIG. 4 and FIG. 5). By continuing the above process, starting from the local optimal solutions just found, we find the 'next' adjacent local optimal solutions and continue the process until the dynamical trajectory-based methodology indicates that all the local optimal solutions are found.

Given a constraint on computation time allowed to find the global optimal solution, a good selection of an initial point which is close to the solution enhances the reliability of our inventive methodology in finding the global optimal solution. We propose therefore to employ the well-known "figures of merit" approach (described in Mockus, J. (1994), Application of Bayesian approach to numerical methods of global and stochastic optimization, *Journal of Global Optimization*, vol. 4, pp. 347-365, the complete disclosure of which is hereby incorporated herein by reference) based on using the stochastic process to determine where to take the initial search points.

Another distinguishing feature of the dynamical trajectory-based methodology is that it works naturally with existing local optimization methods (i.e., local optimizers) to effectively find local optimal solutions, hence making it feasible to interface computer implementation of this invention with existing local optimizer computer software.

Guidelines for constructing such a nonlinear dynamical system are developed in the next section.

Guidelines of Constructing Nonlinear Dynamical Systems

We review some relevant concepts of nonlinear dynamical systems and then present general guidelines for constructing nonlinear dynamical systems whose trajectories can be utilized to perform Step 1 above.

Consider a general nonlinear dynamical system, for example, one described by the following set of ordinary differential equations:

$$\dot{x}(t) = F(x(t)) \qquad (4.2)$$

where $F: \Re^n \to \Re^n$ satisfies conditions for the existence and uniqueness of solutions of (4.2). The solution of (4.2) starting from $x \in \Re^n$ at $t=0$ is called a trajectory, denoted by $\phi_t(x): \Re \to \Re^n$.

A state vector $x^* \in \Re^n$ is called an equilibrium point of system (4.2) if $F(x^*)=0$. We say that an equilibrium point $x^* \in \Re^n$ of (4.2) is hyperbolic if the Jacobian matrix of $F(\bullet)$ at $x^*$ has no eigenvalues with a zero real part. If the Jacobian of the hyperbolic equilibrium point has exactly k eigenvalue with positive real part, we call it a type-k equilibrium point. It can be shown that for a hyperbolic equilibrium point, it is a (asymptotically) stable equilibrium point if all the eigenvalues of its corresponding Jacobian have a negative real part and an unstable equilibrium point if all the eigenvalues of its corresponding Jacobian have a positive real part. For a type-k hyperbolic equilibrium point $x^*$, its stable and unstable manifolds $W^s(x^*)$, $W^u(x^*)$ are defined as follows:

$$W^s(x^*) = \left\{ x \in R^n : \lim_{t \to \infty} \phi_t(x) = x^* \right\}$$

$$W^u(x^*) = \left\{ x \in R^n : \lim_{t \to -\infty} \phi_t(x) = x^* \right\}$$

where the dimension of $W^u(x^*)$ and $W^s(x^*)$ is k and n-k, respectively.

A set K in $\Re^n$ is called to be an invariant set of (4.2) if every trajectory of (4.2) starting in K remains in K for all $t \in \Re$. A dynamical system is called completely stable if every trajectory of the system converges to one of its equilibrium points.

The stability region (or region of attraction) of a stable equilibrium point $x_s$ is the collection of all the points whose trajectories all converge to be defined as:

$$A(x_s) := \left\{ x \in R : \lim_{t \to \infty} \phi_t(x) = x_s \right\}$$

The quasi-stability region $A_p(x_s)$ of a stable equilibrium point $x_s$ is defined as:

$$A_p(x_s) = int(\overline{A(x_s)})$$

where $\overline{A(x_s)}$ is the closure of the stability region $A(x_s)$, and $int(\overline{A(x_s)})$ is the interior of $\overline{A(x_s)}$. From a topological point of view, $A(x_s)$ and $A_p(x_s)$ are open, invariant, and path-connected sets; moreover, they are diffeomorphic to $\Re^n$.

There are several ways to construct nonlinear dynamical systems such that some of their system trajectories can be utilized to perform Step 1. We propose the following general guidelines to construct such nonlinear dynamical systems.

Systems whose trajectories can be employed to perform Step 1 must satisfy the following two conditions:

(C1)—every system trajectory converges, and converges to one of the equilibrium points; and (C2)—the derivative of the objective function C(x) of (4.1) along any system trajectory of the nonlinear dynamical system is non-positive; $\dot{C}(x(t)) \leq 0$; moreover, if it is a non-trivial trajectory (i.e., x(t) is not an equilibrium point), then the set $$\{t \in \Re : \dot{C}(x(t)) = 0\}$$

along x(t) has a measure zero in $\Re$.

One example of a nonlinear dynamical systems satisfying conditions (C1) and (C2) is the following:

$$\dot{x}(t) = -\nabla C(x(t)) \quad (4.3)$$

where $\nabla C: \Re^n \to \Re^n$ is the gradient vector of the objective function in equation (4.1). Another example of a nonlinear dynamical system satisfying conditions (C1) and (C2) is the following:

$$\dot{x}(t) = -A(x)\nabla C(x(t)) \quad (4.4)$$

where A(x) is a bounded, positive definite matrix for all $x \in \Re^n$ and $\nabla C: \Re^n \to \Re^n$ is the gradient vector of the objective function in equation (4.1).

It can be shown that a nonlinear dynamical system satisfying conditions (C1) and (C2) possesses the following properties:

(P1) the nonlinear dynamical system is completely stable and the limit set of the system is composed of only equilibrium points; in other words, no other types of steady-states exist for the system. (This is derived from condition (C1)).

(P2) A point, say $x_s^k$, is a local optimal solution of the nonlinear optimization problem (4.1) if and only if $x_s^k$ is a stable equilibrium point of the nonlinear dynamical system. (This property is derived from conditions (C1) and (C2))

Property (P2) plays an important role in our dynamical trajectory-based methodology to systematically compute all the local optimal solutions of (4.1). It also transforms Step 1 into the following Step:

Step 1: find all the stable equilibrium points solutions of the nonlinear dynamical system that satisfy conditions (C1) and (C2).

Analytical Results

The following analytical results characterize the quasi-stability regions and quasi-stability boundaries of the nonlinear dynamical system that satisfies condition (C1).

Theorem 4-1:

Consider a nonlinear dynamical system described in (4.2) that satisfies condition (C1). Let $A(x_s)$ be the stability region of $x_s$ and $A_p(x_s)$ be the quasi-stability region of $x_s$. If the equilibrium points on the quasi-stability boundary $\partial A_p(x_s)$ are hyperbolic and finite in number, then it follows that:

(1) type-one equilibrium points lying on the quasi-stability boundary $\partial A_p(x_s)$ exist and they are finite in number; and (2) let $x_i$, i=1, 2, . . . be the type-one equilibrium points lying on $\partial A_p(x_s)$ then the quasi-stability boundary $\partial A_p(x_s)$ is the union of the closure of the stable manifold of $x_i$; i.e.

$$\partial a_p(x_s) \subseteq \bigcup_{x_i \in \partial A_p(x_s)} \overline{W^s(x_i)}$$

Furthermore, if the intersections between the stable and unstable manifolds of the equilibrium points on $\partial A_p(x_s)$ satisfy the transversality condition, then:

(3) an equilibrium point $\bar{x}$ lies on the quasi-stability boundary of $x_s$; i.e., $\bar{x} \in \partial A_p(x_s)$ if, and only if, the intersection between the unstable manifold of $\bar{x}$ intersects with both the quasi-stability region and the complement of the closure of the quasi-stability region; i.e. $W^u(\bar{x}) \cap A(x_s) \neq \emptyset$ and $W^u(\bar{x}) \cap \overline{A(x_s)}^c \neq \emptyset$; and (4) $\bar{x} \in \partial A_p(x_s)$ if, and only if, $W^s(x) \subset \partial A_p(x_s)$.

Motivated by the analytical result (2) of Theorem 4-1, we shall call a type-one equilibrium point lying on the quasi-stability boundary a dynamical decomposition point. Furthermore, given a search path (i.e., a search vector) starting from the stable equilibrium point $x_s$ and pointing toward the quasi-stability boundary $\partial A_p(x_s)$, then the search path must hit it at one point, termed the exit point, before it leaves the quasi-stability region $\partial A_p(x_s)$ (see FIG. 5). Hence, the dynamical decomposition point with respect to the stable equilibrium point $x_s$ and a search path is the unstable equilibrium point whose stable manifold contains the exit point of the search path (i.e., the dynamical decomposition point is the first unstable equilibrium point whose stable manifold is hit by the search path at the exit point). The issue of the uniqueness and existence of the dynamical decomposition point with respect to the stable equilibrium point $x_s$ and a search path is assured by Theorem 4-1.

We next develop analytical results on the dynamical property of dynamical decomposition points.

Theorem 4-2:

Consider a nonlinear dynamical system described in (4.2) that satisfies condition (C1). Let $\partial A_p(x_s)$ be the quasi-stability region of $x_s$ and $x_d \in \partial A_p(x_s)$ be a dynamical decomposition point. If the intersections between the stable and unstable manifolds of the equilibrium points on $\partial A_p(x_s)$ satisfy the transversality condition, then there exists another one and only one stable equilibrium point, say $\bar{x}_s$ of (4.2) such that:

(1) $x_d \in \partial A_p(\bar{x}_s)$ is a dynamical decomposition point with respect to $\bar{x}_s$; and (2) $W^u(x_d) \cap A_p(x_s) \neq \emptyset$ and $W^u(x_d) \cap A_p(\bar{x}_s) \neq \emptyset$.

The task of finding a dynamical decomposition point (DDP) is generally very difficult. This difficulty comes in part from the following complexities:

(1) the DDP is a particular unstable equilibrium point embedded in a large-degree state-space; and (2) the DDP is the first unstable equilibrium point whose stable manifold is hit by the search path (at the exit point).

The task of computing the DDP is further complicated by the size and the shape of its convergence region. It is known that, with respect to a selected numerical method, each equilibrium point has its own convergence region (i.e., the region from which the sequence generated by the numerical method starting from a point in the region will converge to the equilibrium point.) Due to the 'small' size and the irregular shape (fractal-like) of the convergence region of the unstable equilibrium point, the task of computing the DDP is very challenging. If an initial guess is not sufficiently close to the DDP, then the resulting sequence generated by, for example, the Newton method, will diverge or converge to another e.p. Unfortunately, finding an initial guess sufficiently close to the DDP is a difficult task A DDP Search Method One key contribution of this invention is the development of a practical numerical method for reliably computing dynamical decomposition points for large-scale systems. We first present a conceptual method, followed by a numerical method.

We consider the nonlinear dynamical system described (4.2) that satisfies conditions (C1) and (C2). Described below is a conceptual method for computing the DDP with respect to the stable equilibrium point $x_s$ and a search vector $\hat{s}$ Step 1—Move along the search path $\phi_t(x_s) \equiv \{x_s + t \times \hat{s}, t \in \Re^+\}$ starting from $x_s$ and detect the exit point, say $x_{ex}$, at which the search path $\phi_t(x_s)$ exits the stability boundary of the stable equilibrium point (i.e. the local optimal solution) $x_s$.

Step 2—Use the exit point $x_{ex}$ as the initial condition and integrate the nonlinear system (4.2) to an equilibrium point. Let the equilibrium point be $x_d$.

Step 3—The DDP with respect to the local optimal solution $x_s$ and the search path is $x_d$.

A numerical implementation of Step 1 of the above conceptual method is presented below.

A Method for Computing the Exit Point

Step 1—Move along the search path $\phi_t(x_s) \equiv \{x_s + t \times \hat{s}, t \in \Re^+\}$ starting from $x_s$ and detect the exit point, say $x_{ex}$ which is the first local maximum of the objective function $C(x)$ along the search path $\phi_t(x_s)$.

A numerical implementation of Step 2 of the above conceptual method, which is an extension of a known method, is presented below:

A Method for Computing the DDP

Step 2.1—Use the exit point $x_{ex}$ as the initial condition and integrate the nonlinear system (4.2) to the first local minimum of the norm $\|F(x)\|$, where $F(x)$ is the vector of the vector field (4.2). Let the local minimum point be $x_d^0$. This point is termed the minimum distance point (MDP).

Step 2.2—Use the MDP $x_d^0$ as the initial guess and solve the following set of nonlinear algebraic equations of the vector field (4.2)

$$F(x)=0$$

Let the solution be $x_d$. The dynamical decomposition point with respect to the local optimal solution $x_s$ and the search path $\phi_t(x_s)$ is $x_d$.

Another numerical scheme to detect the exit point is to compute the inner-product of the search vector and the vector field at each time step. When the sign of the inner-product changes from positive to negative, the exit point is detected. Hence, we propose another numerical method to detect the exit point:

Move along the search path $\phi_t(x_s) \equiv \{x_s + t \times \hat{s}, t \in \Re^+\}$ starting from $x_s$ and at each time-step, compute the inner-product of the search vector $\hat{s}$ and the vector field $F(x)$. When the sign of the inner-product changes from positive to negative, the exit point is detected.

However, due to the nature of numerical simulation on a digital computer, the exit point along the search path cannot be calculated exactly (to be the point lying on the stability boundary of the reduced-state system). Consequently, there are two possible locations of the computed exit point along the fault-on trajectory: one is the point before the sign of the inner-product changes and another is after the sign changes. Under normal situations, either one can be used as a simulated exit point. However, there are cases where the calculation of the dynamical decomposition point can be very sensitive to the accuracy of the exit point, and the above method may encounter a numerical convergence problem. To overcome this numerical problem, we propose the following method to improve the accuracy of computing the exit point via a linear interpolation scheme which is described as following.

An Improved Method for Computing Exit Point

Suppose that the value of the inner-product at time $t_1$ is $d_1$, $d_1 > 0$ and the next time-step $t_2$ results in a negative inner-product $d_2 < 0$. Then one linear interpolation is applied to the time interval $[t_1, t_2]$, which leads to an interpolated time $t_0 \subset [t_1, t_2]$:

$$t_0 = \frac{d_2 t_1 - d_1 t_2}{d_2 - d_1}$$

Then the inner-product at $t_0$ is computed accurately as $d_0$. If the absolute value of $d_0$ is sufficiently small (close to zero), to will be treated as the instant of the exit point time. If the absolute value of $d_0$ is not sufficiently small, two possibilities may occur:

(1) If $d_0 > 0$, one more linear interpolation is applied to the time interval $[t_0, t_1]$.

(2) If $d_0 < 0$, one more linear interpolation is applied to the time interval $[t_1, t_0]$.

The above process can be repeatedly executed until the absolute value of the inner-product at the interpolated time is smaller than a specified tolerance. In summary, a procedure for accurate detection of the exit point by employing the linear interpolation method can be implemented as follows:

Step 1—Move along the search vector until the inner-product changes sign, say between the interval $[t_1, t_2]$ Step 2—Apply the linear interpolation to the interval $[t_1, t_2]$, which produces an intermediate time to where the interpolated inner-product is expected to be zero. Compute the exact inner-product at $t_0$. If the value is smaller than a threshold value, the exit point is obtained. Exit loop.

Step 3—If the inner-product is positive, then replace $t_1$ with $t_0$; otherwise replace $t_2$ with $t_0$ and go to Step 2.

An Improved Method for Computing MDP

Two important steps in computing a dynamical decomposition point are the computations of the exit point (EP) and the minimal distance point (MDP). The accuracy of computing a dynamical decomposition point depends on the accuracy of computing the MDP and the EP. A numerical error in computing the exit point will probably cause a numerical difficulty in computing the MDP. Likewise, a numerical error in computing the MDP will probably cause a numerical difficulty in computing the dynamical decomposition point.

In certain situations where an EP can be at some significant distance from the corresponding dynamical decomposition point, the following numerical difficulties can arise:

the MDP cannot be numerically found;

the found MDP is not sufficiently close to the dynamical decomposition point so that the nonlinear algebraic solver either diverges or converges to an incorrect dynamical decomposition point.

The MDP can be used as an initial guess in the Newton method to compute the dynamical decomposition point. It is however well known that if the MDP is sufficiently close to the dynamical decomposition point, then the sequence generated by the Newton method starting from the MDP will converge to the dynamical decomposition point; otherwise, the sequence may converge to another equilibrium point or diverge.

To find an adequate MDP for reliably computing the dynamical decomposition point, we develop an effective procedure to guide the search process of the MDP. The procedure is described in the following (see FIGS. 8-11):

An Effective Method for Computing the MDP

Step 1—(trajectory generation) Use the exit point as an initial condition and integrate the nonlinear system (4.2) satisfying the conditions (C1) and (C2) for a few time-steps, say 5, and let the end point be denoted as the current exit point.

Step 2—(convergence checking) Check the convergence criterion: if the norm of the point (obtained in Step 1) is smaller than a threshold value, then the point is declared as the MDP; otherwise, go to next step.

Step 3—(corrected exit point) Draw a ray connecting the current exit point on the trajectory and the local optimal solution (i.e., the stable equilibrium point). Replace the current exit point with the corrected exit point which is the (first) local maximal point of objective function along the ray starting from the stable equilibrium point. Assign this point to the exit point and go to Step 1.

Figure 12:
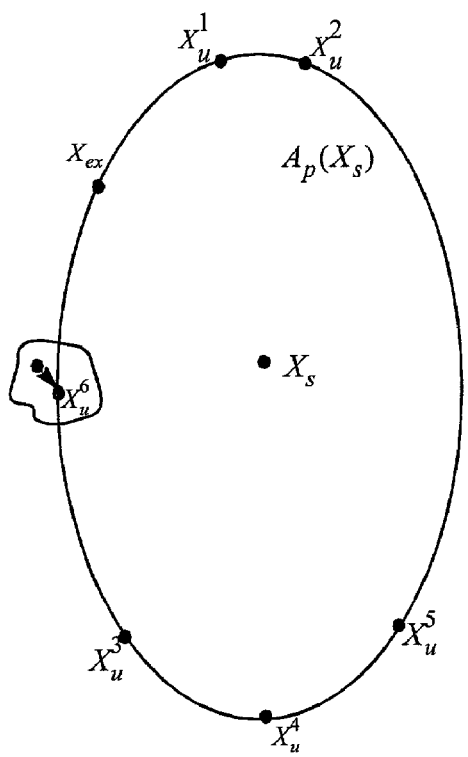
FIG. 12 shows a schematic wherein the MDP lies inside the convergence region of the dynamical decomposition point $x_u^6$ with respect to a nonlinear algebraic solver so that the solver can easily compute find $x_u^6$

The process of checking the zero crossing can be sped up by starting the search from the current point on the trajectory instead of starting from the stable equilibrium point. The sign of the inner-product at the current point determines the direction for starting the local maximal search. Note that the MDP obtained by using the above method is likely to lie inside the convergence region of a dynamical decomposition point with respect to a nonlinear algebraic solver so that the solver can easily find the dynamical decomposition point (see FIG. 12).

We are now in a position to present a numerical DDP search method for computing the DDP with respect to the stable equilibrium point $x_s$ and a search vector $\hat{s}$.

A Numerical DDP Search Method

Step 1—Move along the search path $\phi_t(x_s) \equiv \{x_s + t \times \hat{s}, t \in \Re^+\}$ starting from x, and detect the moment that the inner-product of the search vector $\hat{s}$ and the vector field $F(x)$ changes sign, say between the interval $[t_1, t_2]$. Stop this step if $t_1$ is greater than a threshold value and report that there is no adjacent local optimal solution along this search path; otherwise, go to Step 2.

Step 2—Apply the linear interpolation to the interval $[t_1, t_2]$, which produces an intermediate time $t_0$ where the interpolated inner-product is expected to be zero. Compute the exact inner-product at $t_0$. If the value is smaller than a threshold value, the exit point is obtained and go to Step 4.

Step 3—If the inner-product is positive, then replace $t_1$ with $t_0$; otherwise replace $t_2$ with $t_0$ and go to Step 2.

Step 4—Use the exit point as an initial condition and integrate the nonlinear system for a few time-steps, say 5.

Step 5—Check the convergence criterion: if the norm of the point (obtained in Step 4) is smaller than a threshold value, then the point is declared as the MDP and go to Step 7; otherwise, go to next step.

Step 6—Draw a ray connecting the current point on the trajectory and the local optimal solution (i.e., the stable equilibrium point). Replace the current point with the corrected exit point which is the (first) local maximal point of objective function along the ray starting from the stable equilibrium point. Assign this point to the exit point and go to Step 4.

Step 7—Use the MDP as the initial guess and solve the following set of nonlinear algebraic equations of the vector field (4.2)

$$F(x) = 0$$

Let the solution be $t_d$. The DDP with respect to the local optimal solution $x_s$ and the vector $\hat{s}$ is $x_d$.

A Hybrid Search Method

The idea of combining two different methods into one method in order to merge their advantages and reduce their disadvantages is well known and widely accepted. The main issue inherent in such a combination is what to merge and how to merge it. The hybrid search method developed and incorporated into the global optimizer in this invention combines the dynamical trajectory method and one effective local method (also termed an effective local optimizer) for finding local optimal solutions such as the Quasi-Newton method or the trust region method (see, e.g., R. H. Byrd, R. B. Schnabel, and G. A. Shultz, A trust region algorithm for nonlinearly constrained optimization, *SIAM J Numer. Anal.*, 24, pp. 1152-1170, 1987, the complete disclosure of which is hereby incorporated herein by reference), as shown in the following. The hybrid method shares the reliability and accuracy of the former method and the computational speed of the latter.

A Hybrid Search Method

Initialization: Given an Initial Point

Step 1—Integrate the nonlinear dynamical system described by (4.2) that satisfies condition (C1) from the initial point for a few time-steps to get an end point and then update the initial point using the endpoint before going to Step 2.

Step 2—Apply an effective local optimizer starting from the end point in Step 1 to continue the search process. If it converges, then stop; otherwise, return to Step 1.

An effective local optimizer (i.e., local optimization method) such as the Quasi-Newton method, the trust region method, or the "hill-climbing" method exploits local information (such as gradient vector and, sometimes, Hessian matrix) to effectively find a local optimal solution. However, each "hill-climbing" method has its own 'convergent region' for each local optimal solution. If the initial point does not lie inside the stability region of a local optimal solution, then the method will not find the solution and may diverge. Our dynamical trajectory-based method can bring the initial point inside the convergent region of the local optimal solution and from there the "hill-climbing" method finds the solution. Hence, the hybrid search method enhances the reliability of the "hill-climbing" method while maintaining its computational efficiency in finding the local optimal solution.

The theoretical basis of the (robust) theory-based hybrid search method is the following:

the search space $$S = \cup \overline{A}_p(x_s^i), i=1, 2, \ldots$$

In other words, the search space equals the closure of the quasi-stability region of every stable equilibrium point of the nonlinear dynamical system (4.2). Hence, every point of the search space generically lies inside the quasi-stability region of a stable equilibrium point. Consequently, every trajectory of (4.2) will converge to a stable equilibrium point which is a local optimal solution; in particular, the trajectory after some finite time will stay inside the stability region of a "hill-climbing" method and from there the "hill-climbing" method finds the local optimal solution.

Deterministic Search for Another Local Optimal Solution

Two important issues in the search for the global optimal solution are the following:

(i) how to effectively move (escape) from a local optimal solution and move on toward another local optimal solution;

(ii) how to avoid revisiting local optimal solutions which are already found; and (iii) how to avoid searching regions which contain either no local optimal solutions or previously found local optimal solutions.

Significant efforts have been directed in the past to attempting to address this issue, but without much success. In this invention, DDP-based search method and anti-revisiting search method to overcome these issues will be developed and incorporated into the dynamical trajectory-based methodology. Dynamical decomposition points play an essential role in the development of these methods. We next show that dynamical decomposition points can be utilized in the development of schemes for the following tasks:

Step 1—escape from a local optimal solution

Step 2—guarantee the existence of another local optimal solution

Step 3—avoid re-visit of the local optimal solution of Step 2

Step 4—assist in the search of the local optimal solution of Step 2

Step 5—guarantee the non-existence of another adjacent local optimal solution along a search path.

We present a numerical method to illustrate how the dynamical decomposition points can be utilized for performing the above five tasks; in particular, a numerical method for performing a procedure, which searches from a local optimal solution to find another local optimal solution in a deterministic manner, is presented below. Let $x_{opt}$ be a local optimal solution.

Given: a local optimal solution, say $x_{opt}$

Purpose: find another local optimal solution

Step 1—Move along a search path starting from $x_{opt}$ and apply the DDP search method to compute the corresponding DDP and go to Step 2. If a DDP can not be found, then try another search path and repeat this step.

Step 2—(Anti-revisiting search method)

Let the DDP be denoted as $x_d$. If $x_d$ has previously been found, then go to Step 1; otherwise go to Step 3.

Step 3—(DDP-based numerical method)

Compute a DDP-based initial point $x_o = x_{opt} + (1+\epsilon)(x_d - x_{opt})$ where $\epsilon$ is a small number. (Note that $x_0$ lies inside the quasi-stability region of the corresponding adjacent local solution.) Apply the hybrid search method starting from $x_0$ to find the corresponding adjacent local optimal solution.

The existence of DDP (by Theorem 4-1) ensures Step 1 is well defined.

Two different search paths can have the same DDP. If the dynamical decomposition point found in Step 1 is already known, then, according to Theorem 4-2, there is one and only one local optimal solution, in addition to $x_{opt}$, that is related to the dynamical decomposition point $x_d$; hence there is no need to search for the other local optimal solution because it must have previously been found. Hence, the scheme in Step 2 provides an anti-revisiting search of a already-known local optimal solution.

Since the unstable manifold of $x_d$ converges to only two stable equilibrium points; $x_{opt}$ and another one, for example, $x_{opt}^{ano}$, this makes it possible that two local optimal solutions can be connected via the unstable manifold of the same DDP. The scheme in Step 2 again provides the function of an anti-revisiting search of previously found local optimal solutions.

Given a search path, the existence of a DDP guarantees the existence of another local optimal solution in the direction of the search path. Likewise, the non-existence a DDP guarantees the non-existence of another adjacent local optimal solution in the direction of the search path.

The basis of the method is described as follows. We treat the problem of how to escape from a local optimal solution of the optimization problem (4.1) and to move on toward another local optimal solution as the problem of how to escape from the quasi-stability region of the corresponding (asymptotically) stable equilibrium point (s.e.p.) of (4.2) and enter into the quasi-stability region of another corresponding s.e.p. of (4.2). It can be shown that the intersection between the closures for the quasi-stability regions of these two s.e.p.s is the stable manifold of a dynamical decomposition point; moreover, the unstable manifold of the dynamic decomposition point connect these two s.e.p.s. Note that once a system trajectory lies inside the stability region of a s.e.p., then the ensuing system trajectory will converge to the s.e.p., which is a local optimal solution of (4.1).

Figure 13:
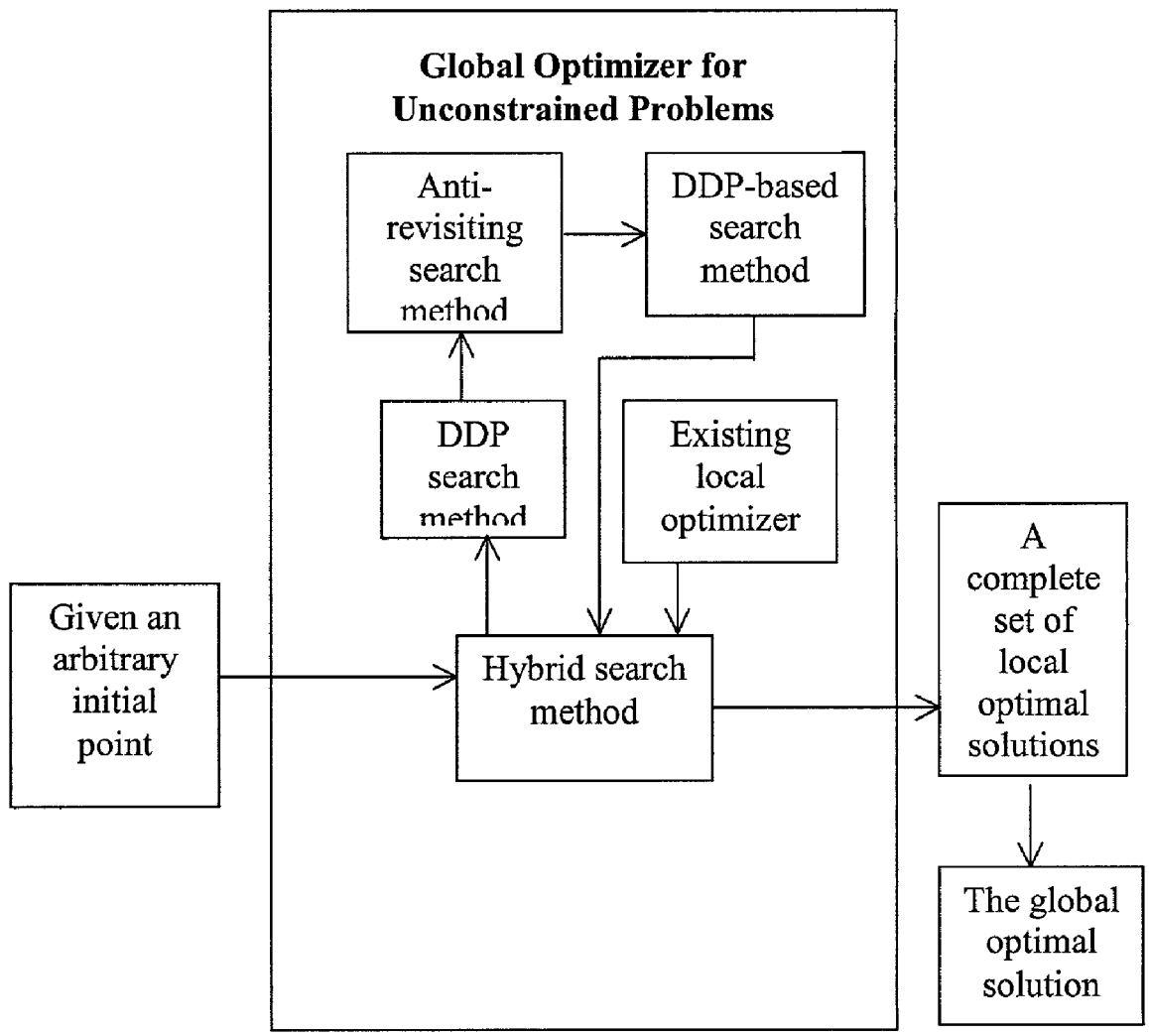
FIG. 13 shows a flow-chart of the overall architecture of the invented dynamical trajectory-based methodology for unconstrained optimization problems. Given an initial point, it generates a comprehensive set of local optimal solutions and the global optimal solution.
Figure 14:
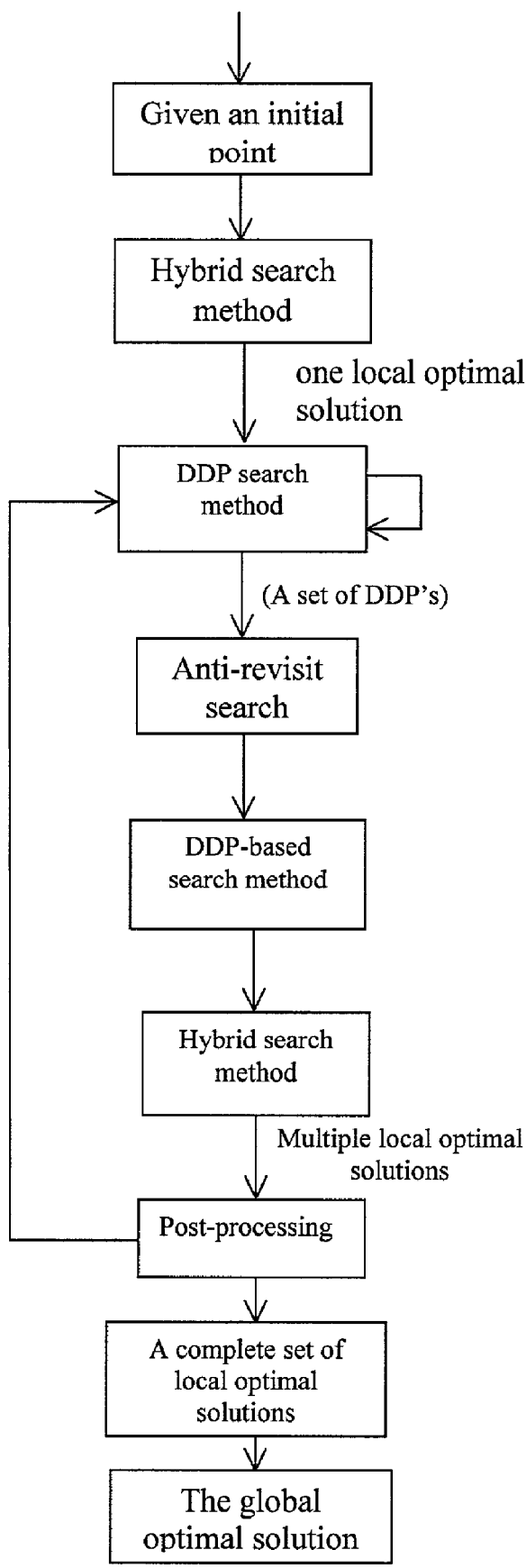
FIG. 14 shows a flow-chart of the invented dynamical trajectory-based methodology for unconstrained optimization problems.
Figure 15:
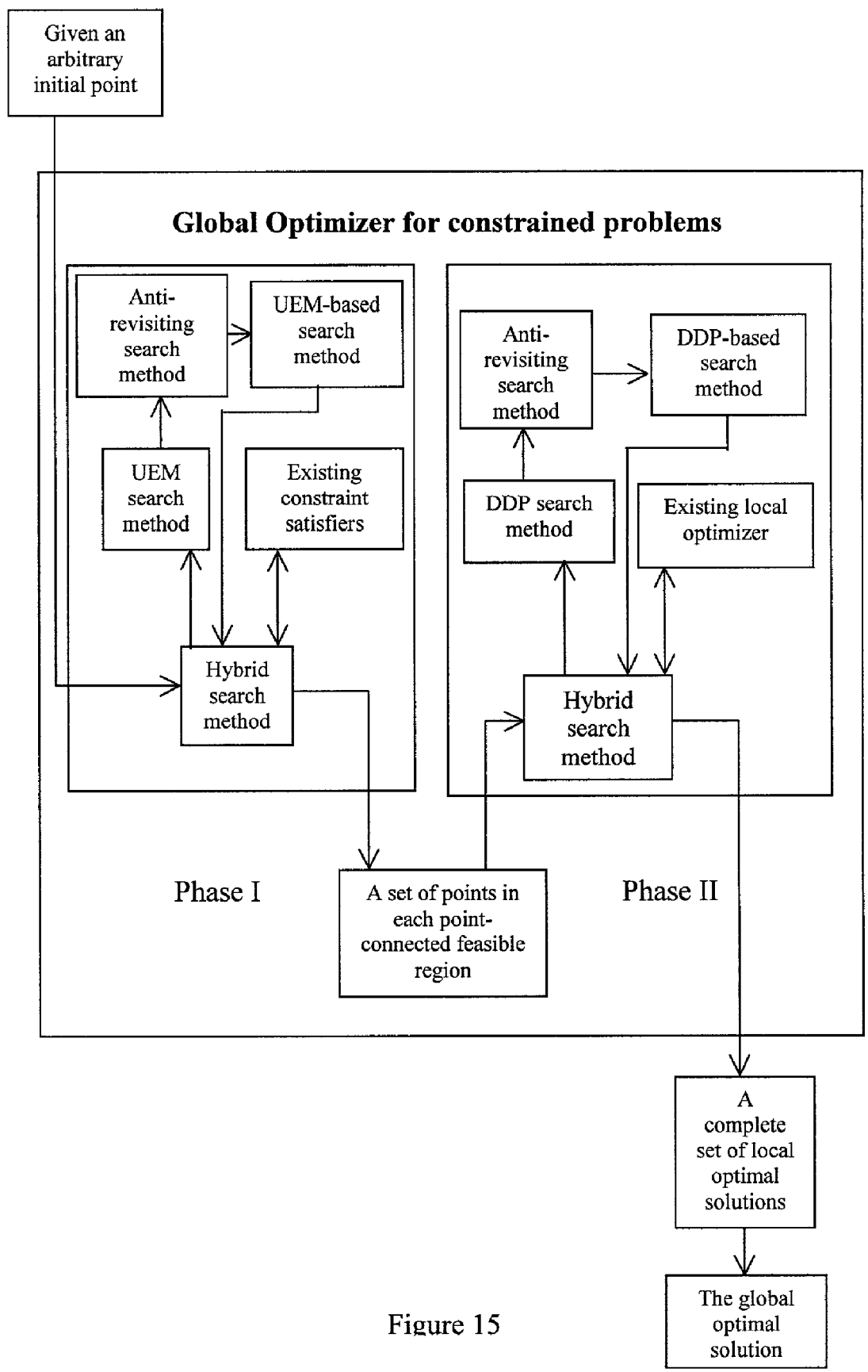
FIG. 15 shows a flow-chart of the overall architecture of the invented dynamical trajectory-based methodology for constrained optimization problems. Given an initial point, it generates a comprehensive set of local optimal solutions and the global optimal solution.

We are now in a position to present the dynamical trajectory-based methodology to systematically compute, starting from an arbitrary initial point, all the local optimal solutions as well as the global optimal solution of (4.1). The architecture of the dynamical trajectory-based methodology is shown in FIG. 13 and its flowchart in FIG. 14.

Step 1—(Initialization)

Choose a starting point and set the set of dynamical decomposition points $V_d^0 = \{\phi\}$ and the set of local optimal solutions $V_s^0 = \{\phi\}$.

Step 2—(Find a local optimal solution)

Apply the theory-based hybrid search method above using the starting point to find a local optimal solution, say $x_s^0$, and set j=0 and $V_{new}^j = \{\phi\}$ Step 3—Set j=j+1. For each local optimal solution in the set $V_{new}^j$, say $x_s^j$, perform the following Step 4-Step 6:

Step 4—(find all the adjacent dynamical decomposition points)

Define a set of search vectors $s_i^j$, i=1, 2, ..., m

For each search vector $s_i^j$, apply the numerical DDP search method presented above to find the corresponding DDP. Let it be denoted as $x_{d,j}^i$. Set $V_d^j = V_d^j \cup \{x_{d,j}^i\}$.

Step 5—(Assessment of the dynamical decomposition points)

Examine the set $V_d^j$ of all computed dynamical decomposition points and eliminate the same dynamical decomposition points, leaving one in the set.

Step 6—(Find all the adjacent local optimal solutions)

For each dynamical decomposition point $x_{d,j}^i$ in the set $V_d^j$, do the following steps to find the corresponding adjacent local optimal solution. (Note that only one local optimal solution will be found via each dynamical decomposition point)

Step 6.1—(compute an effective initial point)

set $x_{0,j}^i = x_s^j + (1+\epsilon)(x_{d,j}^i - x_s^j)$, where $\epsilon$ is a small number. (Note that $x_{0,j}^i$ lies inside the stability region of the corresponding adjacent local optimal solution)

Step 6.2—(Initial search)

Use $x_{0,j}^i$ as the initial condition and integrate the nonlinear system (4.2) to obtain a trajectory $\phi_t(x_{0,j}^i)$ for a few time steps. (Note that the trajectory $\phi_t(x_{0,j}^i)$ will converge to the corresponding adjacent local optimal solution.)

Step 6.3—(hybrid search)

To improve the speed of the search process to the adjacent local optimal solution, monitor the convergence performance of trajectory $\phi_t(x_{0,j}^i)$ and properly switch to an effective local optimizer for fast convergence. Let the solution be $x_{s,j}^k$.

Step 6.4—The local optimal solution with respect to the local optimal solution $x_s^j$ and the dynamical decomposition point $x_{d,j}^i$ is $x_{s,j}^k$. Set $V_s^{j+1}=V_s^j \cup \{x_{s,j}^k\}$.

Step 7—(Assessment of local optimal solutions)

Examine the set of all newly computed local optimal solutions, $V_{new}^j = V_s^{j+1} - V_s^j$ and eliminate the redundant ones, if any, leaving one in the set. If the set $V_{new}^j$ is nonempty; and go to Step 3; otherwise go to next step.

Step 8.—(find the global optimal solution)

Identify the global optimal solution from the set of local optimal solutions, $V_s^{j+1}$ found in Step 7 by comparing their objective function values.

Example 2

A Global Optimal Method for Constrained Nonlinear Programming Problems

Consider a general constrained nonlinear optimization problem of the form:

Minimize C(x)

$$\text{Subject to } \begin{aligned} h_i(x) &= 0, i \in I = \{1, \ldots, l\} \\ g_j(x) &\le 0, j \in J = \{1, \ldots, s\} \end{aligned} \quad (4.5)$$

where the objective function $C:\Re^n \to \Re$ is a bounded below smooth function and both the equality constraint function $h_i:\Re^n \to \Re$ and the inequality constraint function $g_j:\Re^n \to \Re$ are continuous for all $i \in I$, $j \in J$.

Global Optimization Method for Constrained Nonlinear Programming Problems

Our inventive methodology for solving unconstrained optimization problems can be applied to solve constrained optimization in the following manner:

Step 1—use a transformation technique available to transform a constrained optimization problem into an unconstrained optimization problem;

Step 2—apply our inventive methodology to solve the transformed, unconstrained optimization problem.

Another inventive methodology for solving constrained optimization problems is explained as follows.

The constraint set of (4.5) defines the following $$CS = \{x \in \Re^n : h_i(x) = 0, i \in I, g_j(x) \le 0, j \in J\} \quad (4.6)$$

which can be any closed subset of $\Re^n$ and its structure can be very complex. The set CS is usually non-convex and disconnected; i.e., it is composed of several (disjoint) connected feasible regions. The task of locating each connected feasible region of the set CS is itself a difficult one.

We can express the inequalities in (4.5) as the equalities $g_j(x) + s_j^2 = 0, j \in J$ via the introduction of slack variables $s_j$. Other transformation techniques which reduce the original primal problem (4.5) to an optimization problem without inequality constraints such as (4.7) below can also be used. Hence, we consider, without loss of generality, the following optimization problem with equality constraints:

Minimize C(x)

$$\text{Subject to } h_i(x) = 0, i \in I = \{1, \ldots, l\} \quad (4.7)$$

We also define the following equality vector $$H(x) := (h_1(x), \ldots h_m(x))^T.$$

Under some generic conditions, it can be shown that the following constraint set, also termed feasible set, or feasible region $$M = \{x \in \Re^n : H(x) := (h_1(x), \ldots h_m(x))^T = 0\} \quad (4.8)$$

is a smooth manifold. In general, the constraint set M can be very complicated with several disjoint path-connected feasible components; in other words, the constraint set M can be decomposed into several disjoint path-connected, feasible components, say, $$M = \sum_k M_k$$

where each $M_k$ is a path-connected feasible component. Each path-connected component may contain several local optimal solutions of the optimization problem.

There are several (local) optimization methods available that can effectively find local optimal solutions of constrained optimization problems (4.5) but not the global one. During their search process, these methods usually get trapped at a local optimal solution and can not move to another local optimal solution. We maintain that the only reliable way to find the global optimal solution of the constrained nonlinear optimization problem (4.5) can be effectively executed via the following two tasks Step 1—finding all the feasible components, $M_k$, k=1, 2, . . .

Step 2—finding all the local optimal solutions in each feasible component.

In this invention, we develop a numerical two-phase dynamical trajectory-based methodology to systematically compute all the local optimal solutions of (4.5). The key function of each phase is as follows:

Phase I: starting from an arbitrary initial point, it systematically finds all the feasible components $M_k$'s of the constraint (feasible) set M based on the trajectories of one dynamical system described by the following general form $$\dot{x}(t) = F_I(x(t)) \quad (4.9)$$

Phase II: it finds all the local optimal solutions in each feasible component of the constraint set M based on the trajectories of another dynamical system described by the following general form $$\dot{x}(t) = F_{II}(x(t)) \quad (4.10)$$

Guidelines of Constructing Nonlinear Dynamical Systems

We review some relevant concepts of nonlinear non-hyperbolic dynamical systems all then present general guidelines for constructing nonlinear dynamical systems whose trajectories can be utilized to perform Step 1 and Step 2.

Mathematical Preliminaries

We now consider a nonlinear non-hyperbolic dynamical system described by $$\dot{x}(t) = F(x(t)) = M(x)H(x) \quad (4.11)$$

where $H:\Re^n \to \Re^m$ and $M:\Re^n \to \Re^m$, $n \ge m$, satisfy the sufficient conditions for the existence and uniqueness of solutions. The zero set $E_F \equiv F^{-1}(0)$ usually consists of several path-connected components.

A path-connected (compact) component of the zero set $F^{-1}(0)$, say $\Sigma$, is called an equilibrium manifold of system (4.11). We say that an equilibrium manifold $\Sigma$ of (4.11) is l-dimensional if there exists an $\epsilon > 0$ such that $\phi_-: B_e(\Sigma) \to \Sigma$ is locally homeomorphic to a projection from $\Re^n$ to $\Re^l$. We say that an equilibrium manifold $\Sigma$ of (4.11) is hyperbolic if for each $x \in \Sigma$, the Jacobian of $N_H$ at x, denoted by $J_{N_H}(x)$, has no eigenvalues with a zero real part on the normal space $N_x(\Sigma)$, the orthogonal complement is a (asymptotically)

stable equilibrium manifold if for each x∈Σ, all the eigenvalues of its corresponding Jacobian on $N_x(\Sigma)$ have a negative real part; it is an unstable equilibrium manifold if for each x∈Σ, all the eigenvalues of its corresponding Jacobian on $N_x(\Sigma)$ have a positive real part.

For a hyperbolic equilibrium manifold X, its stable and unstable manifolds $W_F^s(\Sigma)$, $W_F^u(\Sigma)$ are defined as follows:

$$W_F^s(\Sigma) = \left\{x \in R^n : \lim_{t \to \infty} \phi_F(t,x) \in \Sigma\right\}$$

$$W_F^u(\Sigma) = \left\{x \in R^n : \lim_{t \to -\infty} \phi_F(t,x) \in \Sigma\right\}$$

The stability region of a stable equilibrium manifold $\Sigma_s$ is defined as $$A_F\left(\sum_s\right) := \left\{x \in R^n : \lim_{t \to \infty} \phi_F(t,x) \in \sum_s\right\}$$

Guidelines

There are several ways to construct nonlinear dynamical systems for performing Step 1 and Step 2. We propose the following guidelines to construct such nonlinear dynamical systems. Nonlinear dynamical system whose trajectories can be utilized to develop computational schemes for performing Step 1 must satisfy the following two conditions:

(C1-1) Every system trajectory converges and converges to one of the equilibrium manifolds; and (C1-2) A set is a stable equilibrium manifold of the nonlinear dynamical system if and only if the set is a path-connected feasible component of the constrained nonlinear optimization problem (4.7).

Note that the condition (C1-1) implies that the limit set of the nonlinear dynamical system is composed of only equilibrium manifolds and no other types of steady-states, such as limit cycles and chaos exist in the system. Conditions (C1-1) and (C1-2) together ensure that almost every trajectory of the nonlinear dynamical system converges to a path-connected feasible component of the constrained optimization problem (4.7).

Nonlinear dynamical system whose trajectories can be utilized to develop computational schemes for performing Step 2 must satisfy the following two conditions:

(C2-1) Every system trajectory converges and converges to one of the equilibrium points.

(C2-2) A point, say $x_{s,j}^k$, is a local optimal solution lying in the feasible component $M_k$ of the nonlinear optimization problem if and only if $x_{s,j}^k$ is an asymptotically stable equilibrium point and $M_k$ is an invariant set of the nonlinear dynamical system.

Note that condition (C2-1) implies that the limit set of the nonlinear dynamical system for performing task 2 is composed of only equilibrium points and no other types of steady-states can exist in the nonlinear system. Condition (C2-2) ensures that the system trajectory stays, during the process of searching for another local optimal solution, in the feasible component $M_k$ so that the constraint set is always satisfied.

One example of nonlinear dynamical systems satisfying conditions (C1-1) and (C1-2) is the following $$\dot{x} = -DH(x)^T H(x) \quad (4.12)$$

where the vector H(x) is constraint vector which defines the feasible region.

One example of nonlinear dynamical systems satisfying conditions (C2-1) and (C2-2) is the following dynamical system:

$$\dot{x}(t) = -P_H(x(t)) \nabla C(X(t)) \quad (4.13)$$

where the projection matrix $$P_H(x) = (I - DH(x)^T (DH(x) DH(x)^T)^{-1} DH(x)) \in \Re^{n \times n}$$

is a positive semi-definite matrix for every x∈M. Note that $P_H(x)\nabla C(x)$ is the orthogonal projection of $\nabla C(x)$ to the tangent space $T_x M$ which means $P_H(x)\nabla C(x) \in T_x M$ for all x∈M. Note that every trajectory of (4.13) starting from $x_0 \in M_k$ stays in $M_k$. In other words, $M_k$ is an invariant set of (4.13). Note that the projection matrix $P_H(x)$ is associated with the constraint set characterized by H(x)

Two-Phase Dynamical Trajectory-Based Methodology

This invention develops a two-phase dynamical trajectory-based methodology to systematically compute all the local optimal solutions of constrained (continuous) nonlinear optimization problems (4.7). The dynamical trajectory-based methodology consists of two distinct phases: In Phase I, starting from an arbitrary starting point, it systematically finds all the feasible components which satisfy the constraint set. In Phase II, it computes all the local optimal solutions in each feasible component found in phase I of the dynamical trajectory-based methodology.

Phase I

Phase I of the dynamical trajectory-based methodology finds all the feasible components via some trajectories of a nonlinear dynamical system. In order to visit each path-connected feasible component of the constraint set M, there are two main steps in Phase I.

Step 1.1—approach a path-connected feasible component of the constrained optimization problem (4.7).

Step 1.2—escape from the path-connected feasible component and approach another path-connected feasible component of the constrained optimization problem (4.7).

We propose to design a nonlinear dynamical system (4.9) which satisfies conditions (C1-1) and (C1-2). We then exploit some system trajectories to develop schemes for performing Step 1.1 & Step 1.2. The central idea in designing the nonlinear dynamical system (4.9) is that every path-connected feasible component $M_k$ corresponds to a stable equilibrium manifold of the nonlinear dynamical system. In this way, the task of finding all the path-connected feasible components of the constrained optimization problem (4.7) can be accomplished via finding all the stable equilibrium manifolds of the nonlinear dynamical system (4.9) which satisfies conditions (C1-1) and (C1-2).

It can be shown that each feasible component of the optimization problem (4.7) can be located via each stable equilibrium manifold of the nonlinear dynamical system (4.9). To numerically implement Phase I of the methodology, the following two tasks are implemented:

Step 1.1—approach a stable equilibrium manifold of the nonlinear dynamical system (4.9).

Step 1.2—escape from the stable equilibrium manifold and approach another stable equilibrium manifold of the nonlinear dynamical system (4.9).

Step 1.1 can be implemented numerically by following the trajectory of the nonlinear dynamical system (4.9) starting from any initial point (which can be an infeasible point of the optimization problem (4.7)), to a point located in a stable equilibrium manifold of system (4.9) (i.e., a point located in a feasible component of the optimization problem (4.7)). Step 1.2 can be implemented numerically by following the trajectory in reverse time starting from an initial point in the stable manifold of system (4.9) until the trajectory approaches a point in a unstable equilibrium manifold on the stability boundary of the stable equilibrium manifold of (4.9); then by following the trajectory starting from an initial point, which is close to the unstable equilibrium manifold but outside the stability region, until it approaches another stable equilibrium manifold of (4.9), which is another feasible component of the optimization problem (4.7).

Phase II

Phase II of the two-phase dynamical trajectory-based methodology finds all the local optimal solutions in each feasible component based on the trajectories of the nonlinear dynamical system (4.10) which satisfies conditions (C2-1) and (C2-2). In order to visit all the local optimal solutions located in each feasible component, there are two main steps in Phase II:

Step 2.1—starting from a point in the feasible component found in Phase I, approach a local optimal solution located in the feasible component of the optimization problem (4.7).

Step 2.2—escape from the local optimal solution and approach another local optimal solution of the same feasible component of the optimization problem (4.7).

We propose to design a nonlinear dynamical system (4.10) which satisfies conditions (C2-1) and (C2-2). We then exploit some system trajectories to develop schemes for performing Step 2.1 & Step 2.2. The key idea in designing the nonlinear dynamical system (4.10) is that all the local optimal solutions of the optimization problem (4.7) corresponds to all the stable equilibrium points of the nonlinear dynamical system (4.10); in particular every local optimal solution of the optimization problem (4.7) corresponds to a stable equilibrium point of the nonlinear dynamical system (4.10) which satisfies conditions (C2-1) and (C2-2). In this way, the task of finding all the path-connected feasible components of the constrained optimization problem (4.7) can be accomplished via finding all the stable equilibrium points of the nonlinear dynamical system (4.10) which satisfies conditions (C2-1) and (C2-2).

To implement numerically Phase II of the methodology, the following three tasks are proposed:

Step 2.1—Find a stable equilibrium point of the nonlinear dynamical system (4.10).

Step 2.2—Move from the stable equilibrium point to a dynamical decomposition point (in order to escape from the local optimal solution)

Step 2.3—Approach another stable equilibrium point of the nonlinear dynamical system (4.10) (in the same path-connected feasible component) via the dynamical decomposition point.

We use a hybrid search method for the numerical implementation of Step 2.1 starting from any initial point located in a feasible component. Step 2.2 can be implemented numerically by, applying the (numerical) dynamical decomposition point method presented herein. Step 2.3 can be implemented numerically by applying the DDP-based numerical method, in combination with the hybrid search method, to find another local optimal solution, to which the unstable manifold of the DDP converges.

Since each path-connected feasible component is an invariant set of the nonlinear dynamical system (4.10), every trajectory starting from any point in the component, say $M_k$, stays in $M_k$ for both positive and negative time. Hence, Phase II of the dynamical trajectory-based methodology only finds all the local optimal solutions in the path-connected component; but not those in other path-connected components. To find the local optimal solutions located in other path-connected feasible components, one needs to invoke phase I again to move from one feasible component of the feasible region and approach another feasible component.

In summary, the dynamical trajectory-based methodology consists of two distinct phases: in Phase I, starting from an arbitrary starting point, it systematically finds all the feasible components which satisfy the constraint set. In Phase II, it computes all the local optimal solutions in each feasible component found in Phase I of the dynamical trajectory-based methodology. By alternating between Phase I and Phase II of the dynamical trajectory-based methodology (hence by switching between the nonlinear dynamical system (4.9) and the nonlinear dynamical system (4.10), all the local optimal solutions of the constrained optimization problem (4.7) can thus be found.

A Hybrid Search Method

The hybrid search methods for Phase I and for Phase II were developed and incorporated into the global optimizer in this invention. They combine the dynamical trajectory method and one effective local method for finding feasible components (Phase I) and for local optimal solutions (Phase II). The hybrid method shares the reliability and accuracy of the former method and the computational speed of the latter.

A Hybrid Search Method for Phase I

Initialization: Given an initial point

Step 1—Integrate the nonlinear dynamical system described by (4.9) that satisfies conditions (C1-1) and (C1-2) from the initial point for a few time-steps to get an end point and then update the initial point using the endpoint before going to Step 2.

Step 2.—Apply an effective local optimizer to find a feasible component, starting from the end point in Step 1 to continue the search process. If it converges (i.e., if it finds a feasible component), then stop; otherwise, return to Step 1.

A Hybrid Search Method for Phase II

Initialization: Given an initial point lying in a feasible component

Step 1—Integrate the nonlinear dynamical system described by (4.10) that satisfies conditions (C2-1) and (C2-2) from the initial point for a few time-steps to get an end point and then update the initial point using the endpoint before going to Step 2.

Step 2—Apply an effective local optimizer to find a local optimal solution, starting from the end point in Step 1 to continue the search process. If it converges (i.e., if it finds a feasible component), then stop; otherwise, return to Step 1.

A Global Optimization Method for Constrained Nonlinear Programming Problems

We are now in a position to present the two-phase dynamical trajectory-based methodology to systematically compute, starting from an arbitrary initial point, all the local optimal solutions as well as the global optimal solution of (4.7). The architecture of the dynamical trajectory-based methodology is shown in FIG. 13. The procedure of Phase II is similar to that of the global optimization method for unconstrained nonlinear programming problems described above. In addition, the procedure of Phase I is also similar to that of the global optimization method for unconstrained nonlinear programming problems, except that the role of stable equilibrium manifold replaces the role of stable equilibrium point and that the role of unstable equilibrium manifold replaces the role of dynamical decomposition point.

A Numerical Method for Phase I

Step 1.—(Initialization)

Choose a starting point and set the set of dynamical decomposition points $V_d^0=\{\phi\}$ and the set of local optimal solutions $V_s^0=\{\phi\}$.

Step 2—(find a path-connected feasible component)

Apply the hybrid search method for Phase I using the starting point to find a point in a path-connected feasible component. Set the point found as an initial point.

Step 3.—(find all the local optimal solutions in the path-connected feasible component)

Starting from the initial point apply the numerical method for Phase II (shown below) to find all the local optimal solutions in the path-connected feasible component.

Step 4—find all the adjacent unstable equilibrium manifolds)

Define a set of search vectors $s_i^j$, $i=1, 2, \ldots, k$

For each search vector $s_i^j$, apply the reverse-time trajectory method to find a point lying in an unstable equilibrium manifold. If a point is found, let it be denoted as $x_{d,j}^i$ and go to Step 5; otherwise go to Step 6.

Step 5—(Find all the adjacent stable equilibrium manifolds, i.e., feasible components)

For each point $x_{d,j}^i$ found in Step 4, do the following steps to find a point in a (path-connected) feasible component.

Step 5.1—(compute an effective initial point)

set $x_{0,j}^i = x_s^j + (1+\epsilon)(x_{d,j}^i - x_s^j)$, where $\epsilon$ is a small number and $x_s^j$ is a local optimal solution found in Step 3. (Note that $x_{0,j}^i$ lies inside the stability region of the corresponding adjacent stable equilibrium manifold)

Step 5.2—(Initial search)

Use $x_{0,j}^i$ as the initial condition and integrate the nonlinear system (4.9) to obtain a trajectory $\phi_t(x_{0,j}^i)$ for a few time steps. (Note that the trajectory $\phi_t(x_{0,j}^i)$ will converge to the corresponding stable equilibrium manifold).

Step 5.3—(hybrid search)

Apply the hybrid search method using the end point of Step 5.2 as an initial point for fast convergence to a point lying in a stable equilibrium manifold. Let the solution be $x^{s,j,k}$ and set it as an initial point, go to Step 3.

Step 6—(find the global optimal solution)

Identify the global optimal solution from the set of local optimal solutions found in Step 3 by comparing their objective function values.

A Numerical Method for Phase II

Step 1.—(Initialization)

Set the set of dynamical decomposition points $V_d=\{\phi\}$ and the set of local optimal solutions $V_s=\{\phi\}$.

Step 2.—(Find a local optimal solution)

Apply the hybrid search method for Phase II starting from the initial point to find a local optimal solution, say $x_s$, and set $j=0$, $V_{new}^j=\{x_s\}$ and $V_s=\{x_s\}$.

Step 3—Set $j=j+1$. For each local optimal solution in the set $V_{new}^j$, say $x_s^j$, perform the following Step 4-Step 6:

Step 4—(find all the adjacent dynamical decomposition points)

Define a set of search vectors $s_i^j$, $i=1, 2, \ldots, m$

For each search vector $s_i^j$, apply the numerical DDP search method presented in Sec. 4.1.3 except that the nonlinear dynamical system (4.10) is employed instead to find the corresponding DDP. Let it be denoted as $x_{d,j}^i$. Set $V_d = V_d \cup \{x_{d,j}^i\}$.

Step 5—(Assessment of the dynamical decomposition points)

Examine the set $V_d$ of all computed dynamical decomposition points and eliminate the same dynamical decomposition points, leaving one in the set.

Step 6—(Find all the adjacent local optimal solutions)

For each dynamical decomposition point $x_{d,j}^i$ in the set $V_d$, do the following steps to find the corresponding adjacent local optimal solution.

Step 6.1—(compute an effective initial point)

Set $x_{0,j}^i = x_s^j + (1+\epsilon)(x_{d,j}^i - x_s^j)$ where $\epsilon$ is a small number. (Note that $x_{0,j}^i$ lies inside the stability region of the corresponding adjacent local optimal solution)

Step 6.2—(Initial search)

Use $x_{0,j}^i$ as the initial condition and integrate the nonlinear system (4.10) to obtain a trajectory $\phi_t(x_{0,j}^i)$ for a few time steps. (Note that the trajectory $\phi_t(x_{0,j}^i)$ will converge to the corresponding adjacent local optimal solution.)

Step 6.3—(hybrid search)

Apply the hybrid search method using the end point of Step 6.2 as an initial point for fast convergence to a local optimal solution. Let the solution be $x_{s,j}^k$.

Step 6.4—The local optimal solution with respect to the local optimal solution $x_s^j$ and the dynamical decomposition point $x_{d,j}^i$ is $x_{s,j}^k$. Set $V_s^{j+1} = V_s^j \cup \{x_{s,j}^k\}$.

Step 7—(Assessment of local optimal solutions)

Examine the set of all newly computed local optimal solutions, $V_{new}^j = V_s^{j+1} - V_s^j$ and eliminate the redundant ones, if any, leaving one in the set. If the set $V_{new}^j$ is non-empty; and go to Step 3; otherwise stop.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A practical numerical computer-implemented method for reliably computing a dynamical decomposition point of a stable equilibrium point for large-scale nonlinear systems, comprising the steps of:
   a) given a stable equilibrium point $x_s$;
   b) moving along a search path $\phi_t(x_s) \equiv \{x_s + t \times \hat{s}, t \in \Re^+\}$ starting from $x_s$ and detecting an exit point, $x_{ex}$, at which said search path $\phi_t(x_s)$ exits a stability boundary of a stable equilibrium point $x_s$;
   c) using said exit point $x_{ex}$ as an initial condition and integrating a nonlinear system to an equilibrium point $x_d$; and
   d) computing said dynamical decomposition point with respect to the stable equilibrium point $x_s$, wherein said search path is $x_d$; and
   e) displaying the dynamical decomposition point.

2. The method of claim 1, wherein a method for computing said exit point of the nonlinear system comprises the step of moving along said search path $\phi_t(x_s) \equiv \{x_s + t \times \hat{s}, t \in \Re^+\}$ starting from $X_s$ and detecting said exit point $x_{ex}$, which is a first local maximum of an objective function $C(x)$ along said search path $\phi_t(x_s)$.

3. The method of claim 1, wherein a method for computing a dynamical decomposition point comprises the steps of:
   a) using said exit point $x_{ex}$ as an initial condition and integrating a nonlinear system to a first local minimum of a norm $\|F(x)\|$ along the corresponding trajectory, where $F(x)$ is a vector field of the nonlinear system, and letting the point at which the first local minimum of $\|F(x)\|$ occurs be denoted $x_d^0$, and is called the minimum distance point (MDP); and
   b) using said MDP $x_d^0$ as an initial guess and solving a set of nonlinear algebraic equations of said vector field $F(x)=0$, wherein a solution is $x_d$, and a dynamical decomposition point with respect to the local optimal solution $x_s$ and said search path $\phi_t(x_s)$ is $x_d$.

4. The method of claim 1, wherein a method for computing said exit point with respect to a stable equilibrium point of the nonlinear system and a search vector comprises the step of computing an inner-product of said search vector and the vector field of the nonlinear system at each time step, by moving along said search path $\phi_t(x_s) \equiv \{x_s + t \times \hat{s}, t \in \Re^+\}$ starting from $x_s$ and at each time-step, computing an inner-product of said search vector $\hat{s}$ and vector field $F(x)$, such that when a sign of said inner-product changes from positive to negative, said exit point is detected.

5. The method of claim 1, wherein a method for computing said exit point of the nonlinear system with respect to a stable equilibrium point and a search vector comprises the steps of:
  a) moving from said stable equilibrium point along said search vector until an inner-product of said search vector and the vector field of the nonlinear system changes sign between an interval $[t_1, t_2]$;
  b) applying a linear interpolation to an interval $[t_1, t_2]$, which produces an intermediate time to where an interpolated inner-product is expected to be zero;
  c) computing an exact inner-product at $t_0$, such that if said value is smaller than a threshold value, said exit point is obtained; and
  d) if said inner-product is positive, then replacing $t_1$ with $t_0$, and otherwise replacing $t_2$ with $t_0$ and going to step b).

6. The method of claim 1, wherein a method for computing a minimum distance point (MDP) of the nonlinear system satisfying required conditions comprises the steps of:
  a) using said exit point as an initial condition and integrating the nonlinear system for a few time-steps, and letting the end point be denoted as the current exit point;
  b) checking convergence criterion, and, if a norm of said current exit point obtained in step a) is smaller than a threshold value, then declaring said point as said MDP and stopping the process, otherwise, going to step c); and
  c) drawing a ray connecting a current exit point on a trajectory and a local optimal solution (equivalently, a stable equilibrium point), replacing said current exit point with a corrected exit point, which is a first local maximal point of objective function along said ray, starting from the stable equilibrium point, and assigning this point to said exit point and going to step a).

7. The method of claim 1, wherein a method for computing said dynamical decomposition point of the nonlinear system satisfying required conditions with respect to a stable equilibrium point $x_s$ and a search vector $\hat{s}$, comprises the steps of:
  a) moving along said search path $\phi_t(x_s) \equiv \{x_s + t \times \hat{s}, t \in \Re^+\}$ starting from $x_s$ and detecting a moment that an inner-product of said search vector $\hat{s}$ and the vector field $F(x)$ of the nonlinear system changes sign, between an interval $[t_1, t_2]$, stopping this step if $t_1$ is greater than a threshold value and reporting that there is no adjacent local optimal solution along this search path, otherwise, going to step b);
  b) applying linear interpolation to said interval $[t_1, t_2]$, which produces an intermediate time to where said interpolated inner-product is expected to be zero, computing an exact inner-product at $t_0$, and if said value is smaller than a threshold value, said exit point is obtained, and going to step d);
  c) if said inner-product is positive, then replacing $t_1$ with $t_0$, and otherwise replacing $t_2$ with $t_0$ and going to step b);
  d) using said exit point as an initial condition and integrating the nonlinear system for a few time-steps, and letting the end point be denoted as the current exit point;
  e) checking convergence criterion, and if a norm of said point obtained in step d) is smaller than a threshold value, then declaring said point as the MDP and going to step g), otherwise going to step e);
  f) drawing a ray connecting a current exit point on said trajectory and a stable equilibrium point, replacing said current exit point with a corrected exit point which is a first local maximal point of objective function along said ray starting from the stable equilibrium point, and assigning this point to said exit point and going to step d); and
  g) using said MDP as an initial guess and solving a set of nonlinear algebraic equations of the vector field of the nonlinear system $F(x)=0$, wherein a solution is $t_d$, such that said DDP with respect to a stable equilibrium point $x_s$ and search vector $\hat{s}$ is $x_d$.

8. A hybrid search computer-implemented method for obtaining a local optimal solution of a general unconstrained nonlinear programming problem starting from any initial point, comprising the steps of:
  a) given an initial point $x_0$;
  b) integrating a nonlinear dynamical system that satisfies required conditions from said initial point $x_0$ to obtain a trajectory $\phi_t(x_0)$ for n time-steps, n being an integer, and recording the last time-step point as the end point, and if it converges to a local optimal solution, then stopping, otherwise, going to step (c);
  c) monitoring a desired convergence performance criterion along the trajectory $\phi_t(x_0)$ in terms of the rate of decreasing values in the objective function under study, and if the desired criterion is satisfied, then using the end point of trajectory $\phi_t(x_0)$ as the initial point and going to step (b), otherwise, going to step (d); and
  d) applying an effective local optimizer (i.e., a method to find a local optimal solution) from said end point in step (b) to continue the search process, and if it finds a local optimal solution, then displaying the local optimal solution and stopping, otherwise, setting the end point of trajectory $\phi_t(x_0)$ as the initial point, namely $x_0$, and going to step (b).

9. The method of claim 8, wherein in step (a) the initial point $x_0$ is given by a method comprising the steps of:
  a) moving along a search path starting from a local optimal solution $x_{opt}$ and applying a DDP search method to compute a corresponding DDP, and if a DDP can be found, then going to step (b), otherwise, trying another search path and repeating this step;
  b) letting said DDP be denoted as $x_d$, and if $x_d$ has previously been found, then going to step a), otherwise going to step c); and
  c) setting $x_0 = x_{opt} + (1+\epsilon)(x_d - x_{opt})$ where $\epsilon$ is a small number, and applying a hybrid search method starting from $x_0$ to find a corresponding adjacent local optimal solution.

10. A computer-implemented method for obtaining a global optimal solution of unconstrained nonlinear optimization problems, comprising the steps of:
  a) choosing a starting point;
  b) applying the hybrid search method of claim 8 using said starting point to find a local optimal solution $x_s^0$;
  c) setting j=0, $V_s = \{x_s^0\}$, $V_{new}^j = \{x_s^0\}$ and $V_d\{\phi\}$;

d) wherein set $V_{new}^{j+1}=\{\phi\}$ and for each local optimal solution in $V_{new}^{j}$ (i.e., $x_s^j$), performing steps (e) through (k);

e) defining a set of search vectors $S_i^j$, $i=1, 2, \ldots, m_j$, and setting $i=1$;

f) if $i>m_j$, then going to step (1); otherwise, applying a DDP search method along the search vector $S_i^j$ to find a corresponding dynamical decomposition point (DDP), and if a DDP is found, then going to step (g), otherwise, setting $i=i+1$ and going to step (f);

g) letting the found DDP be denoted as $x_{d,i}^j$, checking whether it belongs to the set $V_d$, i.e., $x_{d,i}^j \in V_d$?, and if it does, then setting $i=i+1$ and going to step (f), otherwise setting $V_d = V_d \cup \{x_{d,i}^j\}$ and going to step (h);

h) for the DDP $x_{d,i}^j$, performing steps (i) through (j) to find a corresponding adjacent local optimal solution;

i) letting $x_{0,i}^j = x_s^j + (1+\epsilon)(x_{d,i}^j - x_s^j)$, where $\epsilon$ is a small number;

j) applying said hybrid search method using $x_{0,i}^j$ as the initial condition to find the corresponding local optimal solution, and letting it be denoted as $x_{s,j}^i$;

k) checking whether $x_{s,j}^i$ has been found before, i.e., $x_{s,j}^i \in V_s$?, and if it has already been found, then setting $i=i+1$ and going to step (f), otherwise, setting $V_s = V_s \cup \{x_{s,j}^i\}$ and $V_{new}^{j+1} = V_{new}^{j+1} \cup \{x_{s,j}^i\}$ and setting $i=i+1$ and going to step (f);

l) examining the set of all newly computed local optimal solutions, $V_{new}^{j+1}$, and if $V_{new}^{j+1}$ is non-empty, then setting $j=j+1$ and proceeding to step (d), otherwise proceeding to the next step;

m) identifying the global optimal solution from said set of local optimal solutions $V_s$ by comparing their corresponding objective function values in set $V_s$ and;

n) displaying the global optimal solution.

11. A computer-implemented method for obtaining a global optimal solution of a constrained nonlinear programming problem, comprising the steps of:

a) Phase I: finding all feasible components of the constrained nonlinear programming problem wherein one effective local method is combined with said dynamical trajectory method, comprising the following steps to find a feasible solution of the constrained optimization problem:
  i) given an initial point $x_0$;
  ii) integrating a nonlinear dynamical system that satisfies required conditions from said initial point to obtain a trajectory $\phi_t(x_0)$ for n time-steps, n is an integer, and recording the last time-step point as the end point, and if it converges to a feasible solution, then stopping, otherwise, going to step (iii);
  iii) monitoring a desired convergence performance criterion in the objective function $\|H(x)\|$, a vector norm of H(x) in the constrained optimization problem, and if the desired criterion is satisfied, then using the end point of trajectory $\phi_t(x_0)$ as the initial point and going to step (ii), otherwise, going to step (iv); and
  iv) applying an effective method from the said end point in step (b) to continue the search process, and if it finds a feasible solution of the constrained optimization problem then stopping, otherwise, setting the end point of trajectory $\phi_t(x_0)$ in step (ii) as the initial point and going to step (ii); and b) Phase II: finding all local optimal solutions for the constrained nonlinear programming problem in each feasible component;

c) choosing a global optimal solution for the constrained nonlinear programming problem from the local optimal solutions found in step (b); and d) displaying the global optimal solution for the constrained nonlinear programming problem.

12. The method of claim 11, comprising the steps of:
a) approaching a path-connected feasible component of a constrained optimization problem; and
b) escaping from said path-connected feasible component and approaching another path-connected feasible component of said constrained optimization problem.

13. The method of claim 11, comprising the steps of:
a) approaching a stable equilibrium manifold of a nonlinear dynamical system satisfying required conditions; and
b) escaping from said stable equilibrium manifold and approaching another stable equilibrium manifold of said nonlinear dynamical system satisfying said conditions.

14. The method of claim 13, comprising the steps of:
a) choose a starting point;
b) initialization $j=0$;
c) applying a hybrid search method for Phase I using said starting point to find a feasible point in a (path-connected) feasible component, setting a point so found as an initial point, and applying the hybrid search method for Phase II to find a local optimal solution $x_{s,0}^j$;
d) starting from said initial point $x_{s,0}^j$, applying a numerical method for Phase II to find all local optimal solutions in said feasible component and recording them as the set $V_s^j$ and set $V_s = V_s \cup V_s^j$;
e) for the local optimal solution $x_{s,0}^j$, defining a set of search vectors $S_i^j$, $i=1, 2, \ldots, k_j$;
f) if $i>k_j$, then going to step (1), otherwise, going to step (g);
g) for each search vector $S_i^j$, applying a reverse-time trajectory method to find a point lying in an unstable equilibrium manifold of a system, and if a point is found, letting it be denoted as $x_{d,j}^i$, and going to step (h), otherwise setting $i=i+1$ and going to step (f);
h) setting $x_{0,j}^i = x_s^j + (i+\epsilon)(x_{d,j}^i - x_s^j)$, where $\epsilon$ is a small number and $x_s^j$ is a local optimal solution selected in step (e), and applying the hybrid search method for Phase II using $x_{0,j}^i$ as the initial point to find a point lying in a stable equilibrium manifold of system satisfying required conditions, and letting the solution be denoted as $x_{s,j}^0$;
i) starting from said initial point $x_{s,j}^0$ and applying the hybrid search method of step (b) of claim 11 to find a local optimal solution in said (path-connected) feasible component $x_{s,j}^0$;
j) checking whether $x_{s,0}^{j+1}$ has been found before, i.e. $x_{s,0}^{j+1} \in V_s$?, and if it has been bound before (i.e., the said feasible component has been visited before), then setting $i=i+1$ and going to step (f), otherwise setting $V_s = V_s \cup \{x_{s,0}^j\}$ and $V_{new}^{j+1} = V_{new}^{j+1} \cup \{x_{s,0}^{j+1}\}$ and going to step (k);
k) starting from said initial point $x_{s,0}^{j+1}$, applying a numerical method for Phase II to find all local optimal solutions in said feasible component and recording them in the set $V_s^{j+1}$, set $V_s = V_s \cup V_s^{j+1}$ and setting $i=i+1$ and going to step (f);
l) examining the set of all newly computed local optimal solutions $V_{new}^{j+1}$, and if $V_{new}^{j+1}$ is empty, then going to the next step, otherwise, setting $j=j+1$ and going to step (e); and
m) identifying the global optimal solution from said set of local optimal solutions $V_s$ by comparing their objective function values.

15. The method of claim 11, comprising the steps of:
a) starting from a point in a feasible component and approaching a local optimal solution located in said feasible component of an optimization problem; and b) escaping from said local optimal solution and approaching another local optimal solution of said feasible component of said optimization problem.

16. The method of claim 11, comprising the steps of:
   a) in a deterministic manner, first finding all stable equilibrium manifolds of a nonlinear dynamical system that satisfies required conditions;
   b) in a deterministic manner, finding all stable equilibrium points of a nonlinear dynamical system that satisfies said conditions; and
   c) then from said stable equilibrium point, finding a global optimal solution.

17. The method of claim 16, comprising the steps of:
   a) given a feasible solution of constrained nonlinear programming problem;
   b) finding a stable equilibrium point of a nonlinear dynamical system satisfying required conditions;
   c) moving from said stable equilibrium point to a dynamical decomposition point, in order to escape from a local optimal solution; and
   d) approaching another stable equilibrium point of said nonlinear dynamical system satisfying said conditions in the same path-connected feasible component, via said dynamical decomposition point.

18. A hybrid search method for Phase II of claim 11, comprising the following steps to find a local optimal solution of the constrained optimization problem:
   a) given a feasible point $x_0$;
   b) integrating a nonlinear dynamical system that satisfies required conditions from said initial point to obtain a trajectory $\phi_t(x_0)$ for n time-steps, n is an integer, and recording the last time-step point as the end point, and if it converges to a local optimal solution, then stopping, otherwise, going to step (c);
   c) monitoring a desired convergence performance criterion in an objective function $C(x)$, and if the desired criterion is satisfied, then using the end point of trajectory $\phi_t(x_0)$ as the initial point and going to step (b), otherwise, going to step (d); and
   d) applying an effective method from the said end point in step (b) to continue the search process, and if it finds a feasible solution of the constrained optimization problem then stopping, otherwise, setting the end point of trajectory $\phi_t(x_0)$ in step (b) as the initial point and going to step (b).

19. A numerical method for Phase II of claim 11, comprising the following steps to find all the local optimal solutions in said path-connected feasible component:
   a) given an initial point lying in said path-connected feasible component;
   b) initialization;
   c) applying a hybrid search method for Phase II using the initial point to find a local optimal solution $x_s^0$, and setting $j=0$, $V_s=\{x_s^0\}$, $V_{new,II}^j=\{x_s^0\}$ and $V_d=\{\phi\}$;
   d) for each local optimal solution in $V_{new}^j$ (i.e., $x_s^j$), performing steps (e) through (k);
   e) defining a set of search vectors $S_i^j$, $i=1, 2, \ldots, m_j$, and setting $i=1$;
   f) if $i>m_j$, then going to step (1), otherwise, applying a DDP search method, wherein a nonlinear dynamical system satisfies required conditions to find a corresponding dynamical decomposition point (DDP), and if a DDP is found, then going to step (g), otherwise, setting $i=i+1$ and going to step (f);
   g) letting the found DDP be denoted as $x_{d,i}^j$, checking whether it belongs to the set $V_d$, i.e., $x_{d,i}^j \in V_d$?, and if it does, then setting $i=i+1$ and going to step (f), otherwise setting $V_d=V_d \cup \{x_{d,i}^j\}$ and going to step (h);
   h) for the DDP $x_{d,i}^j$, performing steps (i) through (j) to find a corresponding adjacent local optimal solution;
   i) setting $x_{0,i}^j=x_s^j+(1+\epsilon)(x_{d,i}^j-x_s^j)$, where $\epsilon$ is a small number;
   j) applying a hybrid search method using $x_{0,i}^j$ as the initial condition to find the corresponding local optimal solution, and letting it be denoted as $x_{s,j}^i$;
   k) checking whether $x_{s,j}^i$ has been found before, i.e. $x_{s,j}^i \in V_s$?, and if it has already been found, then setting $i=i+1$ and going to step (f), otherwise, setting $V_s=V_s \cup \{x_{s,j}^i\}$ and $V_{new}^{j+1}=V_{new}^{j+1} \cup \{x_{s,j}^i\}$ and setting $i=i+1$ and going to step (f); and
   l) examining the set of all newly computed local optimal solutions $V_{new,II}^{j+1}$, and if $V_{new,II}^{j+1}$ is non-empty, then setting $j=j+1$ and proceeding to step (d), otherwise outputting all the local optimal solutions in said path-connected feasible component contained in set VS and stopping the process.

20. A computer-implemented method for obtaining the global optimal solution of constrained nonlinear programming problems, comprising the steps of:
   a) using a transformation technique to transform a constrained optimization problem into an unconstrained optimization problem, then applying the following steps to find the global optimal solution of the unconstrained optimization problem;
   b) choosing a starting point;
   c) apply a hybrid search method using said starting point to find a local optimal solution $x_s^0$;
   d) setting $j=0$, $V_s=\{x_s^0\}$, $V_{new}^j\{x_s^0\}$ and $V_d=\{\phi\}$;
   e) setting $V_{new}^{j+1}=\{\phi\}$ and for each local optimal solution in $V_{new}^j$ (i.e., $x_s^j$), performing steps (e) through (k);
   f) defining a set of search vectors $S_i^j$, $i=1, 2, \ldots, m_j$, and setting $i=1$;
   g) if $i>m_j$, then going to step (1), otherwise, applying the DDP search method of claim 15 along the search vector $S_i^j$ to find a corresponding dynamical decomposition point (DDP), and if a DDP is found, then going to step (g), otherwise, setting $i=i+1$ and going to step (f);
   h) letting the found DDP be denoted as $x_{d,i}^j$, checking whether it belongs to the set $V_d$, i.e., $x_{d,i}^j \in V_d$?, and if it does, then setting $i=i+1$ and going to step (f), otherwise setting $V_d=V_d \cup \{x_{d,i}^j\}$ and going to step (h);
   i) for the DDP $x_{d,i}^j$, performing steps (i) through (j) to find a corresponding adjacent local optimal solution;
   j) setting $x_{0,i}^j=x_s^j+(1+\epsilon)(x_{d,i}^j-x_s^j)$, where $\epsilon$ is a small number;
   k) applying a hybrid search method using $x_{0,i}^j$ as the initial condition to find the corresponding local optimal solution, and letting it be denoted as $x_{s,j}^i$;
   l) checking whether $x_{s,j}^i$ has been found before, i.e. $x_{s,j}^i \in V_s$?, and if it has already been found, then setting $i=i+1$ and going to step (f), otherwise, setting $V_s=V_s \cup \{x_{s,j}^i\}$ and $V_{new}^{j+1}=V_{new}^{j+1} \cup \{x_{s,j}^i\}$ and setting $i=i+1$ and going to step (f);
   m) examining the set of all newly computed local optimal solutions, $V_{new}^{j+1}$, and if $V_{new}^{j+1}$ is non-empty, then setting $j=j+1$ and proceeding to step (d), otherwise proceeding to the next step;
   n) identifying the global optimal solution from said set of local optimal solutions $V_s$ by comparing their corresponding objective function values in set $V_s$; and
   o) displaying the global optimal solution.

* * * * *

UNITED STATES PATENT AND TRADEMARK OFFICE
CERTIFICATE OF CORRECTION

PATENT NO. : 7,277,832 B2
APPLICATION NO. : 09/849213
DATED : October 2, 2007
INVENTOR(S) : Hsiao-Dong Chiang It is certified that error appears in the above-identified patent and that said Letters Patent is hereby corrected as shown below:

Claim 2, Column 24, line 53: Delete "$x_5$" and add -- $x_s$ --.

Claim 5, Column 25, line 22: Delete the word "to" and add -- $t_0$ --.

Claim 7, Column 25, line 63: Delete the word "to" and add -- $t_0$ --.

Claim 14, Column 28, line 46: Delete "$x_{s,j}^0$" and add the figure --  $x_{s,0}^{j+1}$ --.

Signed and Sealed this

Eighth Day of April, 2008

JON W. DUDAS
*Director of the United States Patent and Trademark Office*